United States Patent
Sakuragi et al.

(10) Patent No.: US 9,863,593 B2
(45) Date of Patent: Jan. 9, 2018

(54) DAYLIGHTING FILM

(71) Applicant: SHARP KABUSHIKI KAISHA, Osaka-shi, Osaka (JP)

(72) Inventors: Kazuyoshi Sakuragi, Osaka (JP); Tsuyoshi Kamada, Osaka (JP); Shun Ueki, Osaka (JP); Tomoko Nango, Osaka (JP); Masahiro Tsujimoto, Osaka (JP); Yuhsuke Tsuda, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/035,570

(22) PCT Filed: Nov. 10, 2014

(86) PCT No.: PCT/JP2014/079706
§ 371 (c)(1),
(2) Date: May 10, 2016

(87) PCT Pub. No.: WO2015/072420
PCT Pub. Date: May 21, 2015

(65) Prior Publication Data
US 2016/0273724 A1 Sep. 22, 2016

(30) Foreign Application Priority Data
Nov. 13, 2013 (JP) .................... 2013-235051

(51) Int. Cl.
*G02B 27/00* (2006.01)
*F21S 11/00* (2006.01)
(Continued)

(52) U.S. Cl.
CPC ............... *F21S 11/007* (2013.01); *E06B 3/66* (2013.01); *E06B 3/67* (2013.01); *E06B 5/00* (2013.01);
(Continued)

(58) Field of Classification Search
USPC .......................................................... 359/592
See application file for complete search history.

(56) References Cited

U.S. PATENT DOCUMENTS 4,101,324 A * 7/1978 Mizuno ................. G03F 7/2022
430/262
5,461,496 A * 10/1995 Kanada ..................... E06B 9/24
359/592

(Continued)

FOREIGN PATENT DOCUMENTS

JP 58-146689 9/1983
JP 2005-527864 9/2005

(Continued)

OTHER PUBLICATIONS

International Search Report for PCT/JP2014/079706 dated Jan. 20, 2015, 4 pages.

(Continued)

*Primary Examiner* — Rodney Fuller
(74) *Attorney, Agent, or Firm* — Nixon & Vanderhye P.C.

(57) ABSTRACT

A daylighting film (1) according to one aspect of the present invention includes a base member (10) having optical transparency, first projections (11) having optical transparency and formed on an inner surface (10*a*) of the base member (10), a second projection (12) formed on the inner surface (10*a*) and having a height from the inner surface (10*a*) higher than a height of the first projections (11), a protective base member (13) arranged in an opposite relation to the inner surface (10*a*) of the base member (10), a bonding layer (14) for bonding the second projection (12) and the protective base member (13), and gaps (15) defined between the first projections (11) and between the first projection (11) and the second projection (12), wherein the first projections (11) include reflective surfaces (11*c*2) at which light incom- (Continued)

ing from an outer surface (13b) side of the protective base member (13) or the base member (10) is totally reflected.

16 Claims, 34 Drawing Sheets

(51) Int. Cl.
| | |
|---|---|
| *E06B 3/66* | (2006.01) |
| *E06B 5/00* | (2006.01) |
| *G02B 5/00* | (2006.01) |
| *E06B 3/67* | (2006.01) |
| *G02B 7/182* | (2006.01) |
| *G02B 17/00* | (2006.01) |

(52) U.S. Cl.
CPC ................ *F21S 11/00* (2013.01); *G02B 5/00* (2013.01); *G02B 7/182* (2013.01); *G02B 17/006* (2013.01)

(56) References Cited

U.S. PATENT DOCUMENTS

| | | | | |
|---|---|---|---|---|
| 5,771,328 A | * | 6/1998 | Wortman | ................... F21V 5/02 349/62 |
| 7,142,767 B2 | * | 11/2006 | Gardiner | ................ G02B 5/045 353/33 |
| 9,417,363 B2 | * | 8/2016 | Inoue | ................... G02B 3/0068 |
| 9,557,448 B2 | * | 1/2017 | Kato | ................... G02F 1/13338 |
| 2003/0223216 A1 | | 12/2003 | Emmons et al. | |
| 2008/0030859 A1 | * | 2/2008 | Usami | ............... B29D 11/00278 359/592 |
| 2009/0009870 A1 | | 1/2009 | Usami | |
| 2012/0033302 A1 | | 2/2012 | Suzuki et al. | |
| 2014/0104689 A1 | * | 4/2014 | Padiyath | ............... G02B 5/0242 359/592 |
| 2015/0049387 A1 | * | 2/2015 | Kashiwagi | ............ B29C 43/021 359/592 |
| 2016/0025288 A1 | * | 1/2016 | Vasylyev | ............... G02B 1/046 359/595 |
| 2016/0252225 A1 | * | 9/2016 | Tsujimoto | ................. E06B 9/24 |
| 2017/0003545 A1 | * | 1/2017 | Asaoka | ............ G02F 1/13363 |
| 2017/0023197 A1 | * | 1/2017 | Ueki | .................... G02B 5/0215 |

FOREIGN PATENT DOCUMENTS

| | | |
|---|---|---|
| JP | 2005-288836 | 10/2005 |
| JP | 2008-040021 | 2/2008 |
| JP | 2009-009078 | 1/2009 |
| JP | 2012-038626 | 2/2012 |
| JP | 2012-255951 | 12/2012 |

OTHER PUBLICATIONS

Written Opinion for PCT/JP2014/079706 dated Jan. 20, 2015, 3 pages.

* cited by examiner

DAYLIGHTING FILM

TECHNICAL FIELD

The present invention relates to a daylighting film.

This application is the U.S. national phase of International Application No. PCT/JP2014/079706 filed on Nov. 10, 2014 which designated the U.S. and claims the priority on the basis of Japanese Patent Application No. 2013-235051 filed in Japan on Nov. 13, 2013, the entire contents of each of which are hereby incorporated by reference.

BACKGROUND ART

One example of known techniques for efficiently guiding light incident on a window glass into the indoor is disclosed in Patent Literature (PTL) 1. According to the technique disclosed in PTL 1, a daylighting film includes a plurality of unit prisms, which have the daylighting function and which are formed on one surface of an optically-transparent support, and the daylighting film is pasted to an outer surface (outdoor side surface) of the window glass with the unit prisms facing the outside. Light incident on the daylighting film from the unit prism side is refracted at surfaces of the unit prisms and enters the indoor after passing through the unit prisms, the support, and the window glass.

In the case of pasting the daylighting film to the window glass, if structural elements (projections) with the daylighting function are exposed to the outside, there is a possibility that the structural elements (projections) may be contaminated or deformed with impacts. Therefore, the structural elements (projections) need to be covered with a separate base member. PTL 2 and PTL 3 disclose structures including protective base members to prevent damage of the daylighting film.

CITATION LIST

Patent Literature

PTL 1: Japanese Unexamined Patent Application Publication No. 2008-40021
PTL 2: Japanese Unexamined Patent Application Publication No. 2012-38626
PTL 3: Japanese Unexamined Patent Application Publication No. 2012-255951

SUMMARY OF INVENTION

Technical Problem

In the case of bonding the protective base member over the structural elements (projections), however, if a thickness of a bonding layer is increased to ensure adhesion between the protective base member and the structural elements (projections), there is a possibility that the structural elements (projections) are excessively buried in the bonding layer, and that the daylighting function degrades.

The present invention according to one aspect has been made in view of the above-described problems with the related art, and is intended to provide a daylighting film that can realize high adhesion performance between a base member including projections and a protective base member while ensuring daylighting performance of the projections.

Solution to Problem

A daylighting film according to one aspect of the present invention includes a first base member having optical transparency, a plurality of first projections having optical transparency and formed on a first surface of the first base member, a second projection formed on the first surface and having a height from the first surface higher than a height of the first projections, a second base member arranged in an opposite relation to the first surface of the first base member, an adhesive for bonding the second projection and the second base member, and gaps defined between the first projections and between the first projection and the second projection, wherein the first projections include reflective surfaces at which light incoming from a second surface side of the second base member or the first base member is totally reflected.

The second projection may have optical transparency.

A daylighting film according to one aspect of the present invention includes a first base member having optical transparency, a plurality of first projections and a plurality of second projections both having optical transparency and formed on a first surface of the first base member, a second base member arranged in an opposite relation to the first surface of the first base member, a plurality of gaps defined between the first projections, between the second projections, and between the first projection and the second projection, and an adhesive filled into at least one of the plurality of gaps and bonding the first base member and the second base member, wherein the first projections and the second projections include reflective surfaces at which light incoming from a second surface side of the second base member or the first base member is totally reflected.

The adhesive may be filled into the gap surrounded by, among the plurality of second projections, the second projections adjacent to each other on the first surface of the first base member, and by the second base member.

The adhesive may be filled into a gap surrounded by the second projections, the gap being positioned in a space sandwiched between the first base member and the second base member.

A daylighting film according to one aspect of the present invention includes a first base member having optical transparency, a plurality of projections having optical transparency and formed on a first surface of the first base member, a second base member arranged in an opposite relation to the first surface of the first base member, an adhesive for bonding the first base member and the second base member, the adhesive including a spacer, and a gap defined between the projections, wherein the projections include reflective surfaces at which light incoming from a second surface side of the second base member or the first base member is totally reflected.

The second projections may have end surfaces formed, on a side close to the second base member, parallel to the first surface.

A daylighting film according to one aspect of the present invention includes a first base member having optical transparency, a plurality of first projections and a plurality of second projections both having optical transparency and formed on a first surface of the first base member, a second base member arranged in an opposite relation to the first surface of the first base member, an adhesive for bonding the second projections and the second base member, and gaps defined between the first projections, between the second projections, and between the first projection and the second projection, wherein the projections include reflective surfaces at which light incoming from a second surface side of the second base member or the first base member is totally reflected, and the second projections have end surfaces formed, on a side close to the second base member, parallel to the first surface, the end surfaces being bonded to the second base member.

The first projections and the second projections may have equal heights from the first surface of the first base member.

A light transmittance T1 in regions of the first surface of the first base member where the end surfaces of the second projections are present, and a light transmittance T2 in other regions may satisfy a relation of T1<T2.

Assuming that a surface area of an inclined surface of the first projection, the second projection, or the projection is denoted by Sa, and a surface area of a portion of the inclined surface, the portion being buried in the adhesive, is denoted by Sb, Sb≤Sa/2 may be satisfied.

An irregular or uneven surface may be formed at an end of the second projection on a side close to the second base member, the end contacting the adhesive.

Advantageous Effects of Invention

According to one aspect of the present invention, the daylighting film is provided which can realize high adhesion performance between the base member including the projections and the base member for protection while ensuring daylighting performance of the projections.

DESCRIPTION OF EMBODIMENTS

Figure 1A:
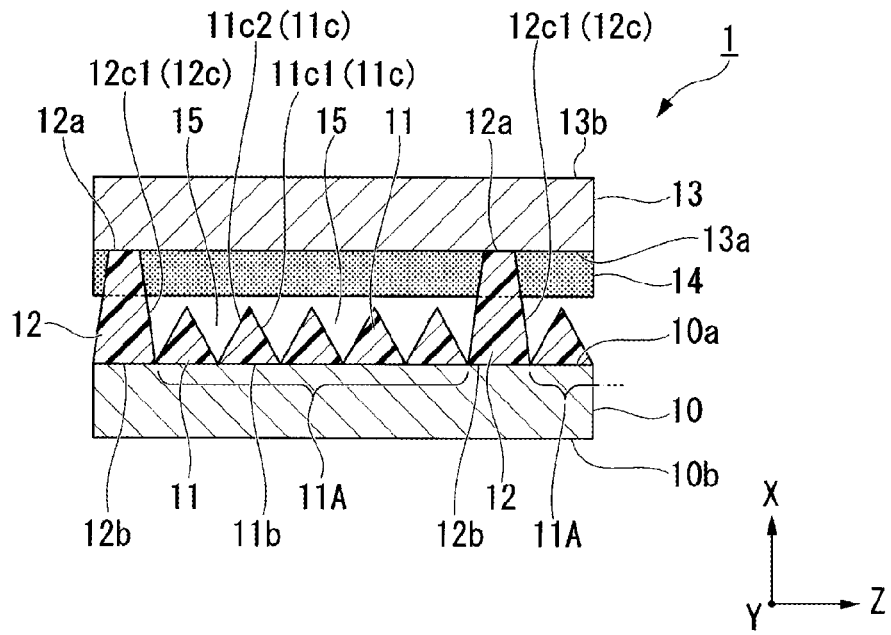
FIG. 1A is a perspective view schematically illustrating a constitution of a daylighting film 1 according to a first embodiment.

Embodiments of the present invention will be described below with reference to the drawings. In the drawings referenced below, an X-direction is defined as a direction normal to a base member of a daylighting film, a Y-direction is defined as a direction orthogonal to the X-direction, and a Z-direction is defined as a direction orthogonal to the X-direction and the Y-direction.

[First Embodiment]

Figure 1B:
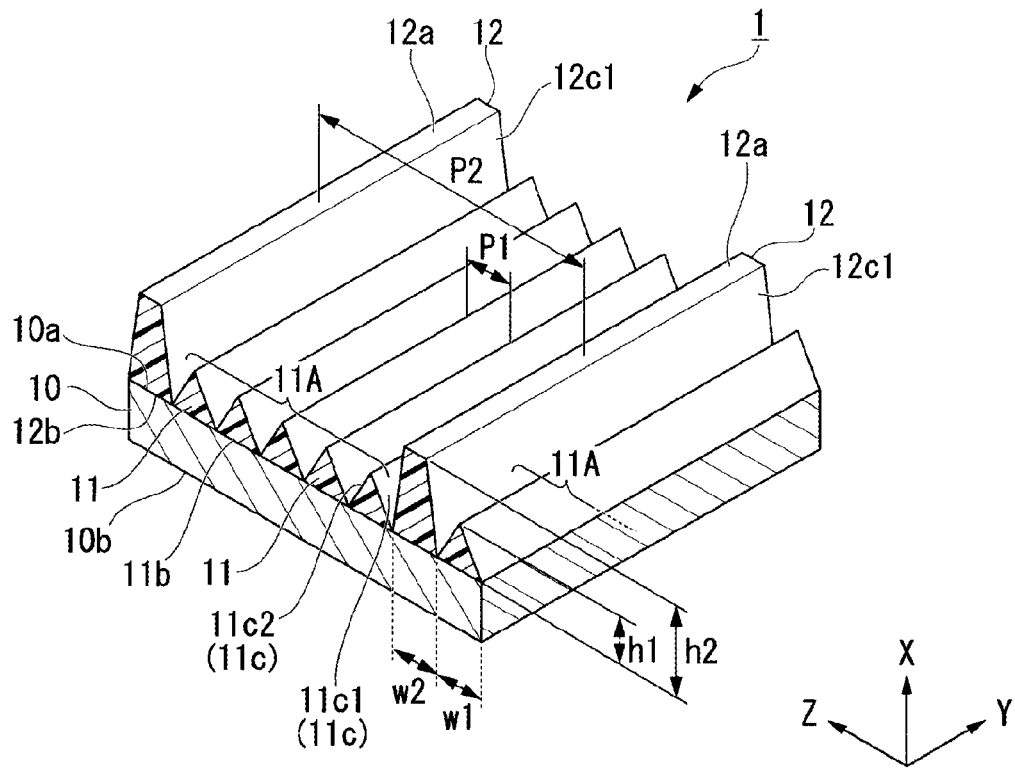
FIG. 1B is a sectional view schematically illustrating a constitution of a base member 10 according to the first embodiment.
Figure 2:
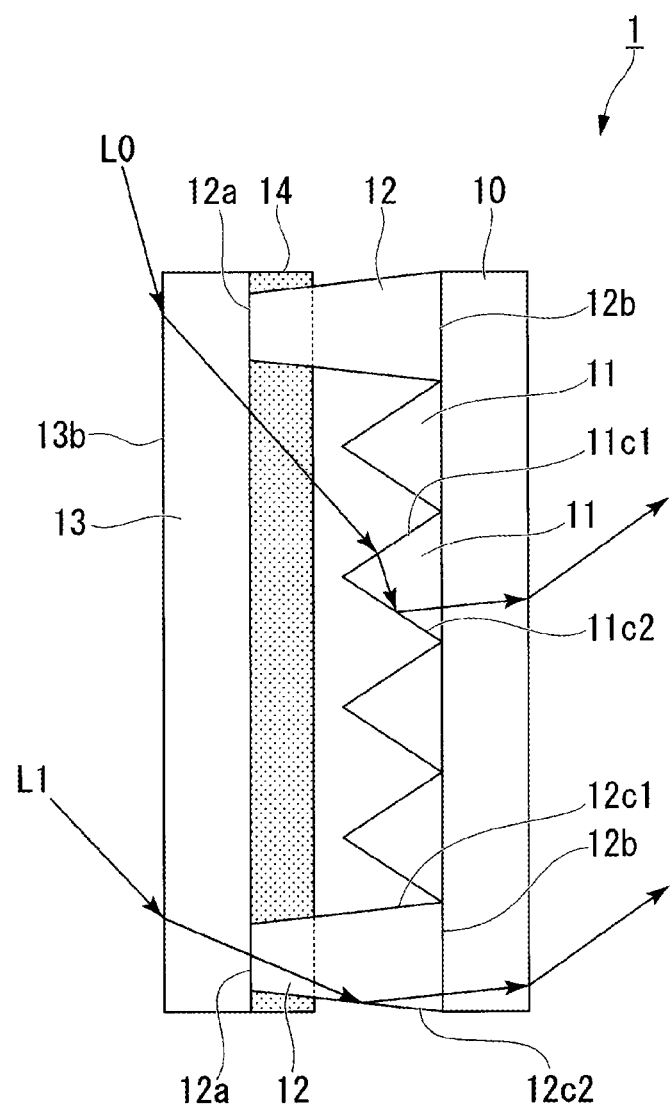
FIG. 2 is an illustration referenced to explain a propagation direction of light passing through the daylighting film.

FIG. 1A is a perspective view schematically illustrating a constitution of a daylighting film 1 according to a first embodiment of the present invention, and FIG. 1B is a perspective view schematically illustrating a constitution of a base member 10. FIG. 2 is a sectional view schematically illustrating the constitution of the base member 10. In other words, FIG. 2 is an illustration referenced to explain a propagation direction of light passing through the daylighting film. It is to be noted that, while FIGS. 1A, 1B and 2 illustrate only six first projections 11 and only two second projections 12, the first projection 11 and the second projection 12 are each actually formed in a large number on the base member 10. This point is similarly applied to the other drawings.

As illustrated in FIGS. 1A and 1B, the daylighting film 1 includes a base member (first base member) 10 having optical transparency. On an inner surface (first surface) 10a of the base member 10, there are disposed the first projections 11 having optical transparency and formed adjacent to each other, and the second projections 12 having a height from the inner surface 10a higher than that of the first projections 11. A gap 15 is defined between adjacent two of the first projections 11, and a bonding layer 14 is disposed in the gap 15. Another gap 15 is defined between the first projection 11 and the second projection 12, and the bonding layer 14 is further disposed in the other gap 15. A protective base member (second base member) 13 is arranged above the base member 10 in an opposite relation to the inner surface 10a. The base member 10 and the protective base member 13 are bonded to each other by the bonding layer 14 illustrated in the form of separated plural layers. Each of the base member 10 and the protective base member 13 has optical transparency.

In this embodiment, not only the first projections 11 having the daylighting function, but also the second projections 12 higher than the first projections 11 are disposed on the base member 10. Although the second projections 12 are used mainly for the bonding to the protective base member 13, they also have the daylighting function similarly to the first projections 11.

The base member 10 and the protective base member 13 are each generally made of, e.g., one of resins such as thermoplastic polymers, thermosetting resins, and photopolymerization resins. Each base member can be made of an optically-transparent base material such as an acrylic polymer, an olefin polymer, a vinyl polymer, a cellulose polymer, an amide polymer, a fluorocarbon polymer, a urethane polymer, a silicone polymer, or an imide polymer. For example, the optically-transparent base material in the form of a triacetyl cellulose (TAC) film, a polyethylene terephthalate (PET) film, a cycloolefin polymer (COP) film, a polycarbonate (PC) film, a polyethylene naphthalate (PEN) film, a polyether sulfone (PES) film, or a polyimide (PI) film is preferably used. In this embodiment, a PET film having a thickness of 100 μm is used by way of example. The total light transmittance of the base member 10 and the protective base member 13 is preferably 90% or more in accordance with the stipulation of JIS K7361-1.

On that condition, sufficient optical transparency can be obtained.

The first projections 11 and the second projections 12 are each made of an organic material having optical transparency and photosensitivity, such as an acrylic resin, an epoxy resin, or a silicone resin. A transparent resin mixture, which is prepared by mixing a polymerization initiator, a coupler, a monomer, an organic solvent, etc. to the above-mentioned resin, can be used. The polymerization initiator may contain various additional components, such as a stabilizer, an inhibitor, a plasticizer, a fluorescent whitener, a parting agent, a chain moving agent, and another photo-polymerizable monomer. In addition, materials stated in Japanese Patent No. 4129991 can also be used. The total light transmittance of the first projection 11 and the second projection 12 is preferably 90% or more in accordance with the stipulation of JIS K7361-1. On that condition, sufficient optical transparency can be obtained.

While the second projections 12 in this embodiment have been described as being made of the organic material having optical transparency and photosensitivity, the second projections 12 may be made of a material having neither optical transparency nor photosensitivity when the daylighting function is not given to the second projections 12.

Each of the first projections 11 and the second projections 12 has a lengthwise direction substantially in one direction (Y-direction), and the one direction is arranged in a direction parallel to one side of the base member 10 having a rectangular shape. In this embodiment, each of the first projections 11 and the second projections 12 is constituted as a stripe-shaped projection having a certain width and extending in the Y-direction. The lengthwise direction of each of the first projections 11 and the second projections 12 is set in alignment with the direction parallel to one side of the base member 10 having the rectangular shape. The first projections 11 are arrayed in a unit of plural projections side by side in a widthwise direction thereof (i.e., in the Z-direction). In this embodiment, five first projections 11 are successively arrayed in one unit. The second projections 12 are each disposed between projection groups 11A, each of which is constituted by the five successive first projections 11, in a contiguous relation to the adjacent projection groups 11A. Respective edges of the adjacent first projections 11 and respective edges of the first projection 11 and the second projection 12 adjacent to each other on the side close to the base member 10 are contacted with each other. As an alternative, those edges may be interconnected.

The first projections 11 are each formed to have a triangular shape in a cross-sectional (XZ-section) parallel to the widthwise direction of the relevant first projection 11, and to have lateral surfaces 11c1 and 11c2 in contact with the gap 15. In this embodiment, one lateral surface 11c2 functions as a reflective surface for reflecting light. To that end, in the first projection 11, light incoming through an outer surface (second surface) 13b of the protective base member 13 is totally reflected at the lateral surface (reflective surface) 11c2.

The second projections 12 are each formed to have a trapezoidal shape in a cross-sectional (XZ-section) parallel to the widthwise direction of the relevant second projection 12, and to have a second end surface 12a at its end on the side close to the protective base member 13, the second end surface 12a being parallel to the inner surface 10a of the base member 10. Each of the second projections 12 formed on the base member 10 has a height from the base member 10 higher than that of each first projection 11. Therefore, the base member 10 is bonded to the protective base member 13 with the aid of the second projections 12 in a state where the first projections 11 are not buried in the bonding layer 14. Since the second projection 12 has the second end surface 12a on the top side, a bonding area of the second projection 12 with respect to an inner surface 13a of the protective base member 13 is increased, and good bonding performance between the second projection 12 and the protective base member 13 is ensured.

The second projection 12 in this embodiment is constituted such that one 12c2 of lateral surfaces 12c1 and 12c2 contacting the gap 15 functions as a reflective surface for reflecting light. Thus, in the second projection 12, light incoming through the outer surface 13b of the protective base member 13 is totally reflected at the lateral surface (reflective surface) 12c2.

Assuming that the width of the first projection 11 in the widthwise direction is denoted by w1, the height of the first projection 11 in the direction normal to the base member 10 (i.e., in the X-direction) is denoted by h1, and the pitch of the first projections 11 in the array direction (Z-direction) is denoted by p1, the widths w1, the heights h1, and the pitches p1 of the plural first projections 11 are set to the same respective values for all the first projections 11. The width w1 of each first projection 11 is, for example, 10 μm to 50 μm, and the height h1 thereof is, for example, 10 μm to 100 μm. The refractive index of each first projection 11 is 1.4 to 1.6.

Assuming that the width of the second projection 12 in the widthwise direction is denoted by w2, the height of the second projection 12 in the direction normal to the base member 10 (i.e., in the X-direction) is denoted by h2, and the pitch of the second projections 12 in the array direction (Z-direction) is denoted by p2, the widths w2, the heights h2, and the pitches p2 of the plural second projections 12 are set to the same respective values for all the second projections 12. The refractive index of each second projection 12 is 1.4 to 1.6.

The gap 15 is filled with gas, e.g., air, and the refractive index of the gap 15 is approximately 1. By setting the refractive index of the gap 15 to 1, a critical angle at an interface 11c between the gap 15 and the first projection 11 and a critical angle at an interface 12c between the gap 15 and the second projection 12 are each minimized. In this embodiment, the gap 15 is an air layer filled with air. However, the gap 15 may be an inert gas layer filled with inert gas, e.g., nitrogen, or may be a depressurized layer in which pressure is reduced.

The bonding layer 14 is formed over the entire inner surface 13a of the protective base member 13 in a substantially constant thickness. The refractive index of the bonding layer 14 is substantially equal to those of the first projection 11 and the second projection 12. The second projections 12 used for the bonding to the protective base member 13 are bonded to the protective base member 13 in such a state that respective tip portions of the second projections 12 are buried in the bonding layer 14. On the other hand, respective tip portions of the first projections 11 having the daylighting function are away from the bonding layer 14 and are not contacted with the bonding layer 14. The thickness of the bonding layer 14 is set to a value at which sufficient bonding strength can be obtained between the base member 10 and the protective base member 13, and at which the first projections 11 are not contacted with the bonding layer 14 in a state where the base member 10 and the protective base member 13 are bonded to each other. As a result, the intrinsic daylighting performance of the first projections 11 can be maintained.

The daylighting film 1 is pasted to a glass pane of a window in a state of the protective base member 13 facing outward such that the array direction of the first projections 11 and the second projections 12 is oriented in a vertical direction.

As illustrated in FIG. 2, of light incoming from the upper side of the daylighting film 1, light L0 having come into the first projection 11 through the lateral surface 11c1 of the first projection 11 is totally reflected at the reflective surface 11c2 of the first projection 11, and then exits toward the upper side of the daylighting film 1 again from the base member 10.

Furthermore, in this embodiment, since the second projection 12 disposed for the bonding between the base member 10 and the protective base member 13 also has optical transparency, light L1 having come into the second projection 12 through the lateral surface 12c1 is totally reflected at the reflective surface 12c2, and then exits toward the upper side of the daylighting film 1 again from the base member 10.

The lights reflected by the first projection 11 and the second projection 12 reach the ceiling and the inner side of the room, and brightly illuminate the inside of the room.

The first projections 11 and the second projections 12 in the daylighting film 1 can be manufactured by a method using a photolithography process, for example. The daylighting film 1 can also be manufactured by one of other methods, e.g., a melt extrusion process and a die extrusion process, than the method using the photolithography process. With the melt extrusion process and the die extrusion process, the base member 10, the first projections 11, and the second projections 12 are integrally formed with the same resin.

While the embodiment has been described above as pasting the outer surface of the protective base member 13 to the glass pane of the window such that light enters the daylighting film 1 from the side including the protective base member 13, the outer surface of the base member 10 may be pasted to the glass pane of the window.

Because the daylighting function is realized by utilizing total reflection at an interface between materials having different refractive indices, the daylighting function degrades with reduction of an area where total reflection occurs. As described above, the refractive index of the first projection 11 is about 1.4 to 1.6 in many cases, and the refractive index of the bonding layer 14 is also equal to that of the first projection 11. Therefore, if the tip portion of the first projection 11 is buried in the bonding layer 14, there is no difference in refractive index at the interface between the bonding layer 14 and the first projection 11, whereby the total reflection does not occur and the daylighting function degrades.

In this embodiment, the second projections 12 higher than the first projections 11 are disposed on the base member 10 for the bonding to the protective base member 13 in addition to the first projections 11 for daylighting, and the tip portions of the second projections 12 are buried in the bonding layer 14 to ensure the bonding area. Thus, the bonding between the base member 10 and the protective base member 13 can be realized with the aid of the second projections 12 without utilizing the first projections 11 for the bonding. Since the second projections 12 are higher than the first projections 11 relative to the base member 10, the tip portions of the first projections 11 are not buried in the bonding layer 14 in the state where the base member 10 and the protective base member 13 are bonded to each other. It is hence possible to obtain the daylighting film 1 in which the first projections 11 are not buried in the bonding layer 14 and the daylighting performance with the first projections 11 can be utilized sufficiently.

Furthermore, since the second end surface 12a of the second projection 12 having the trapezoidal shape in cross-section is face-bonded to the inner surface 13a of the protective base member 13, the bonding area with respect to the protective base member 13 is enlarged and adhesion is increased in comparison with those in the case of bonding the first projection 11 having the triangular shape in cross-section to the protective base member 13. The bonding layer 14 may be formed in a larger thickness such that the tip portion of the second projection 12 is buried in the bonding layer 14 at a larger proportion. This enables the second projection 12 to provide a bonding structure serving as an anchor, whereby higher bonding performance can be realized. However, the thickness of the bonding layer 14 is set to a value at which the tip portion of the first projection 11 is not buried in the bonding layer 14.

Moreover, since, in this embodiment, the second projection 12 used for the bonding is also given with optical transparency to provide the reflective surface, the daylighting function can be further obtained in a portion of the second projection 12, the portion being exposed from the bonding layer 14. As a result, a totally-reflecting area in the daylighting film 1 is increased and the daylighting performance is enhanced.

Figure 3:
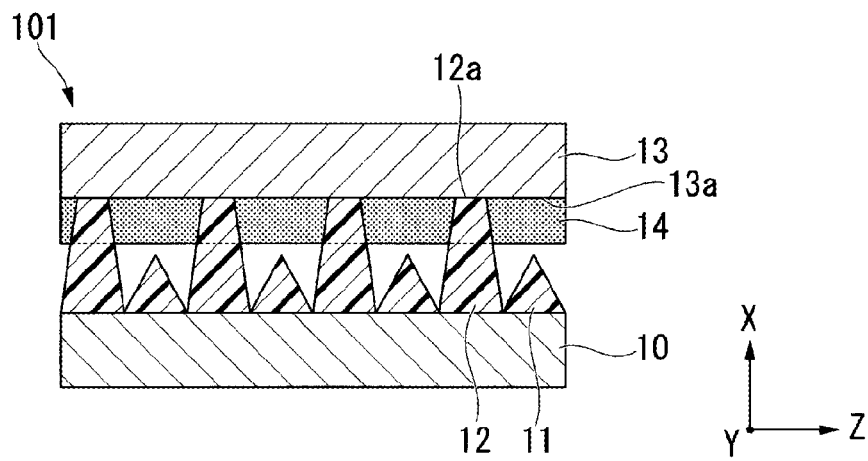
FIG. 3 is a partial sectional view illustrating another practical constitution.

FIG. 3 is a partial sectional view illustrating another practical constitution. In a daylighting film 101 illustrated in FIG. 3, the first projections 11 and the second projections 12 are disposed on the base member 10 such that both the projections are alternately arrayed one by one in the widthwise direction of the first projections 11 and the second projections 12 (i.e., in the Z-direction).

By increasing the number of the second projections 12 disposed on the base member 10 in such a way, the bonding performance with respect to the protective base member 13 can be enhanced.

Figure 4A:
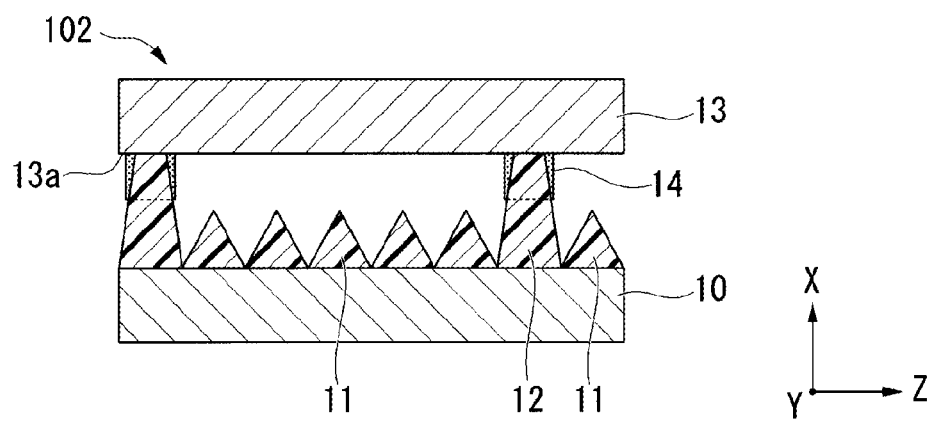
FIG. 4A is a first sectional view illustrating another example of a bonding method.
Figure 4B:
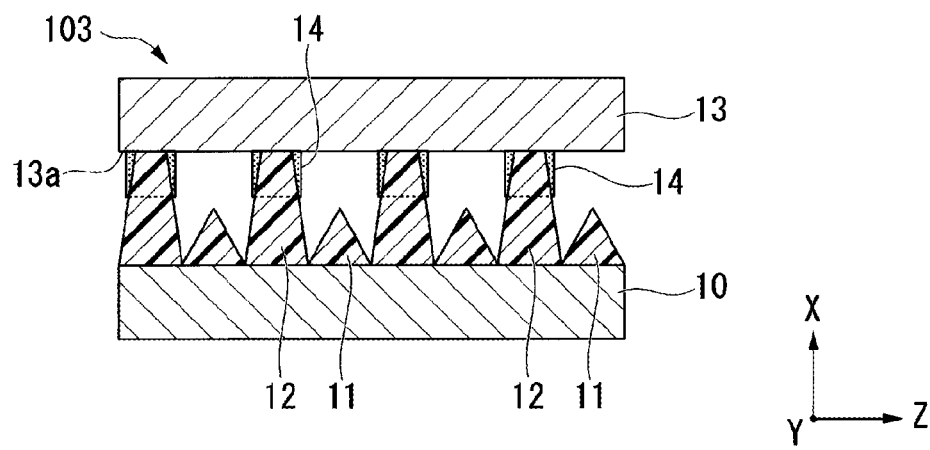
FIG. 4B is a second sectional view illustrating still another example of the bonding method.

FIGS. 4A and 4B are sectional views illustrating other examples of the bonding method.

In each of daylighting films 102 and 103 illustrated in FIGS. 4A and 4B, the bonding layer 14 is partly arranged only at a position corresponding to each of the second projections 12. With such an arrangement, the base member 10 and the protective base member 13 can be bonded to each other with a smaller amount of the adhesive.

[Second Embodiment]

Figure 5:
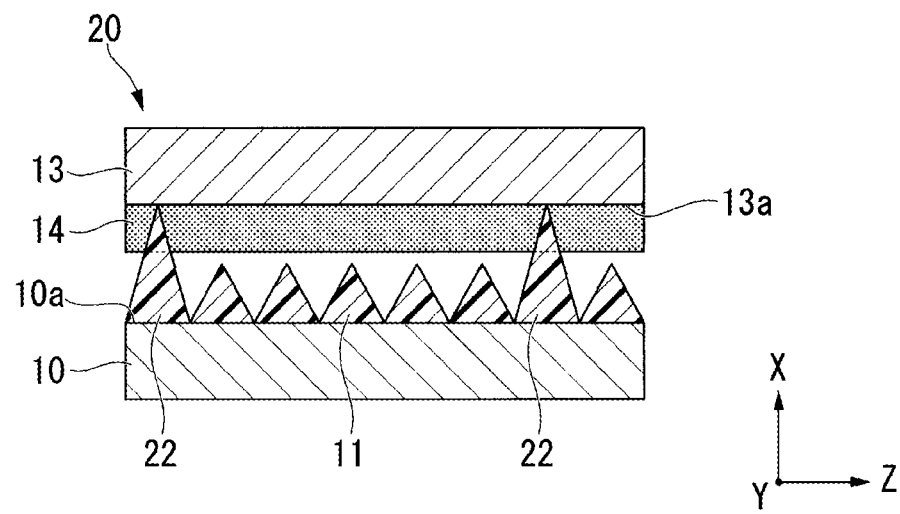
FIG. 5 is a sectional view schematically illustrating a constitution of a daylighting film according to a second embodiment.

FIG. 5 is a sectional view schematically illustrating a constitution of a daylighting film according to a second embodiment of the present invention.

It is to be noted that components in the second embodiment common to those in the first embodiment are denoted by the same reference signs, and detailed descriptions of those components are omitted.

A daylighting film 20 illustrated in FIG. 5 includes, as the projections used for the bonding, projections (second projections) 22 each having a triangular shape in a cross-section (XZ-section). The projections 22 are each formed in a height from the base member 10 higher than that of the first projection 11, and are bonded to the protective base member 13 in such a state that their tip portions are buried in the bonding layer 14. Since the tip portion of each projection 22 used for the bonding is pointed, the tip portion can be more easily buried into the bonding layer 14, and an amount of the bonding layer 14 displaced by the buried tip portion is reduced. As a result, a likelihood of the bonding layer 14, which has been displaced by the projections 22, coming into contact with the first projections 11 is reduced, and the daylighting function with the first projections 11 can be maintained reliably.

Figure 6:
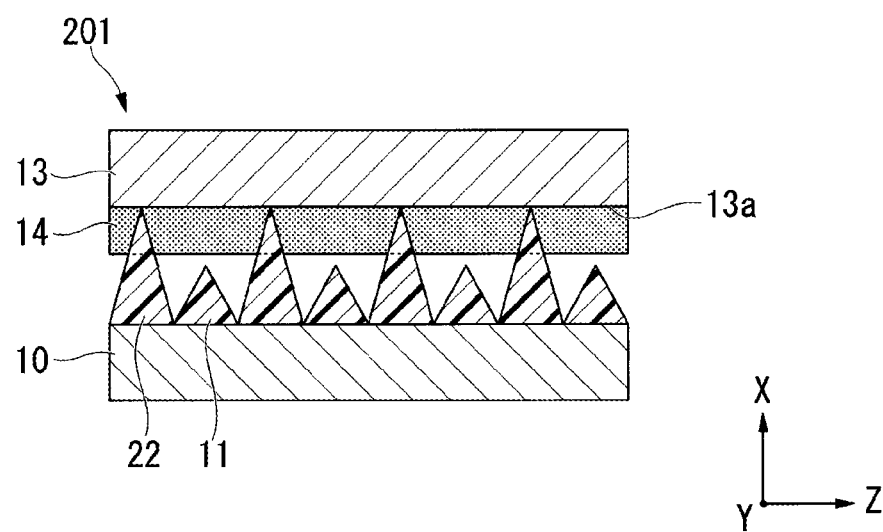
FIG. 6 is a partial sectional view illustrating another practical constitution.

FIG. 6 is a partial sectional view illustrating another practical constitution.

In a bonding film 201 illustrated in FIG. 6, the first projections 11 having the daylighting function and the projections 22 used for the bonding are disposed on the base member 10 such that both the projections are alternately arrayed one by one in the widthwise direction of the first projections 11 and the projections 22 (i.e., in the Z-direction). By increasing the number of the projections 22 disposed on the base member 10 in such a way, the bonding performance with respect to the protective base member 13 is enhanced. Accordingly, good bonding between the base member 10 and the protective base member 13 can be realized even with the projections 22 each having the triangular shape in cross-section (XZ-section).

Because the interval between the arrayed projections 22 is narrowed by increasing the number of the projections 22 used for the bonding, there is a possibility that the thickness of the bonding layer 14 present between the projections 22 may be partly increased with the bonding layer 14 being displaced by the projections 22 upon the bonding to the protective base member 13. However, since the projections 22 each have the triangular shape in cross-section and have the pointed tip portion as described above, the amount of the bonding layer 14 displaced by the adjacent projections 22 is relatively small. In the case of bonding the base member 10 and the protective base member 13 to each other, therefore, a likelihood of the bonding layer 14 present between the adjacent projections 22 coming into contact with the first projections 11 is low. As a result, the daylighting function with the first projections 11 can be maintained even when the number of the projections 22 used for the bonding is increased.

Figure 7A:
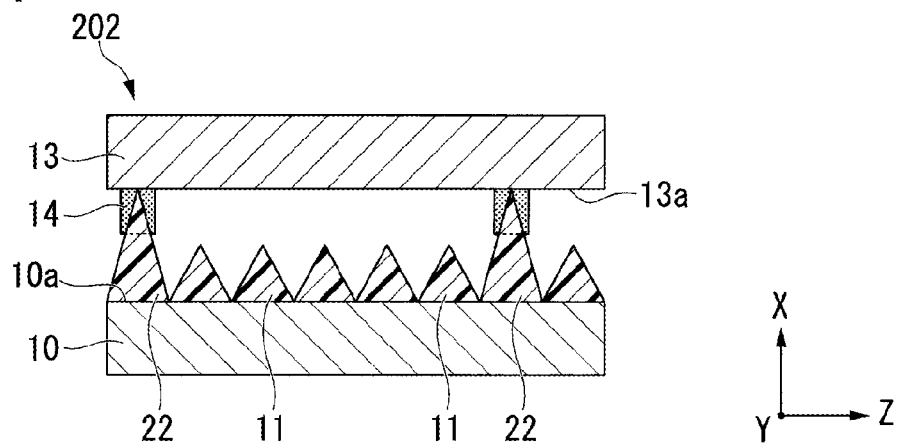
FIG. 7A is a first sectional view illustrating another example of a bonding method.
Figure 7B:
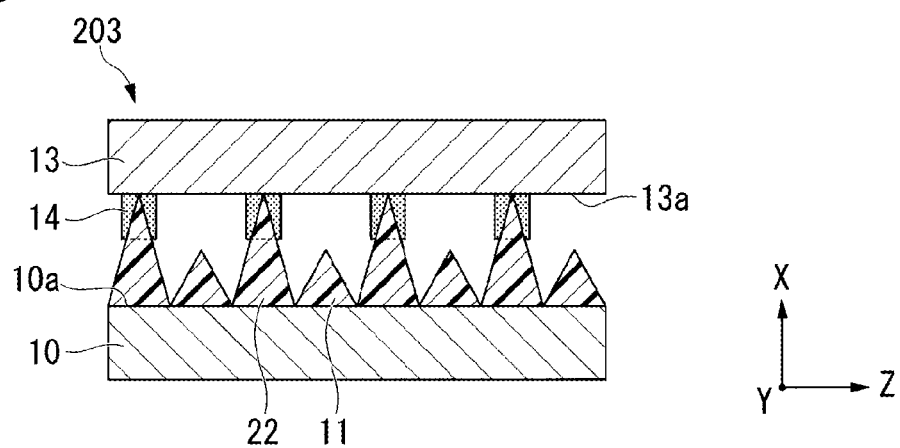
FIG. 7B is a second sectional view illustrating still another example of the bonding method.

FIGS. 7A and 7B are sectional views illustrating other examples of the bonding method.

As in the daylighting films 202 and 203 illustrated in FIGS. 7A and 7B, the bonding layer 14 may be partly arranged only at a position corresponding to each projection 22 having the triangular shape in cross-section (XZ-section). With such an arrangement, the base member 10 and the protective base member 13 can be bonded to each other with a smaller amount of the adhesive.

[Third Embodiment]

Figure 8:
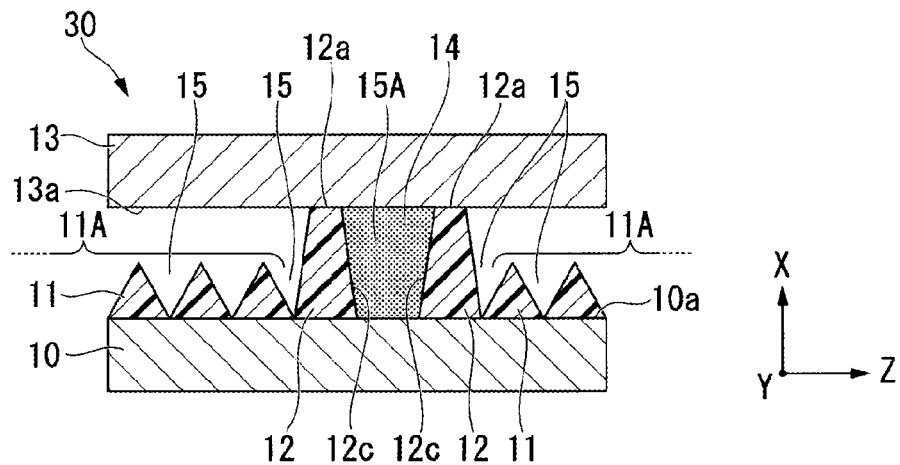
FIG. 8 is a sectional view schematically illustrating a constitution of a daylighting film according to a third embodiment.

FIG. 8 is a sectional view schematically illustrating a constitution of a daylighting film according to a third embodiment of the present invention.

It is to be noted that components in the third embodiment common to those in the first embodiment are denoted by the same reference signs, and detailed descriptions of those components are omitted.

As illustrated in FIG. 8, a daylighting film 30 according to this embodiment includes the first projections 11 and the second projections 12 both having optical transparency and formed on the inner surface 10a of the base member 10, the protective base member 13 arranged in an opposite relation to the inner surface 10a of the base member 10, the gap 15 defined between the first projections 11 adjacent to each other, the gap 15 defined between the first projection 11 and the second projection 12, a gap 15A defined between the second projections 12 adjacent to each other, and the bonding layer 14 filled into the gap 15A for bonding between the base member 10 and the protective base member 13.

More specifically, the second projections 12 are each disposed adjacent to a projection group 11A constituted by the plurality of first projections 11 that are arranged successively. The second projections 12 adjacent to each other on the base member 10 are arranged in a spaced relation, and the inner surface 10a of the base member 10 is partly exposed between the adjacent second projections 12.

Between the adjacent second projections 12 arranged in a spaced relation, the gap 15A is defined in a state surrounded by the pair of the second projections 12, the base member 10, and the protective base member 13. An adhesive is filled into the gap 15A to form the bonding layer 14, and the base member 10 and the protective base member 13 are bonded to each other by the bonding layer 14.

In the case of manufacturing the daylighting film 30 of this embodiment, after forming the first projections 11 and the second projections 12 on the base member 10, the adhesive is filled into the gap 15A defined between the second projections 12 arranged in a spaced relation. Then, the protective base member 13 is arranged on and bonded to the base member 10. At that time, the bonding is performed in a manner of avoiding bubbles from coming into the gap 15A.

The adhesive having spilled from the gap 15A can be captured with the end surfaces 12a of the second projections 12. Since the second projections 12 and the protective base member 13 are further bonded to each other with the adhesive having infiltrated into between the end surfaces 12a and the protective base member 13, stronger bonding can be realized.

Thus, the adhesive is allowed to flow into between the end surfaces 12a of the second projections 12 and the inner surface 13a of the protective base member 13. However, an amount of the filled adhesive is to be adjusted such that the adhesive will not flow out to the side including the first projection 11 adjacent to the second projection 12 through the boundary between the end surface 12a and the inner surface 13a.

With the constitution described above, the bonding layer 14 can be formed in the gap 15A surrounded by the base member 10, the protective base member 13, and the adjacent second projections 12. The bonding layer 14 is contacted with the inner surface 10a of the base member 10, the opposing lateral surfaces 12c of the second projections 12, and with the inner surface 13a of the protective base member 13, thus directly bonding the base member 10 and the protective base member 13 to each other. Furthermore, a bonding area of the bonding layer 14 with respect to the protective base member 13 can be adjusted depending on the spacing between the second projections 12 arranged adjacent to each other. Accordingly, a larger bonding area can be ensured in comparison with that obtained in the case of bonding only the end surfaces 12a of the second projections 12 to the protective base member 13. Hence the bonding strength between both the base members is increased.

Moreover, since light passes through the bonding layer 14, optical transparency of the daylighting film 30 is increased.

Figure 9:
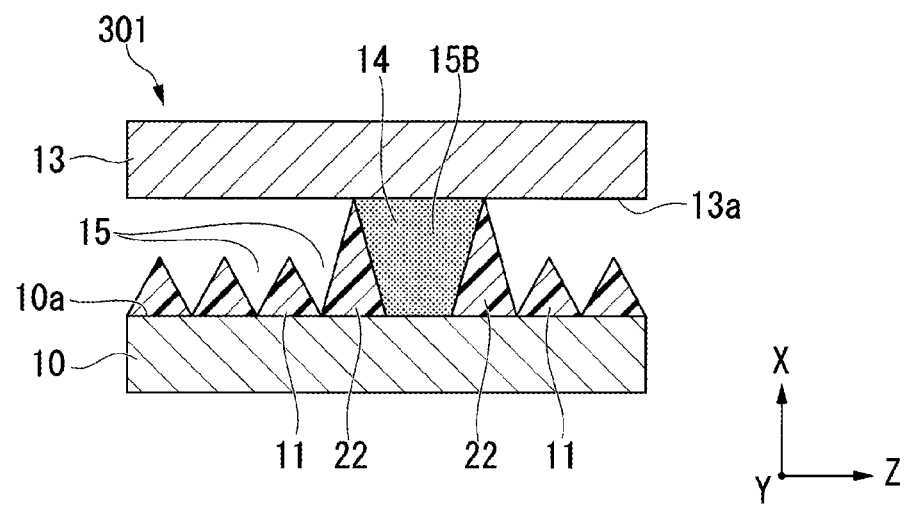
FIG. 9 illustrates a structure in which an adhesive is filled into a gap between second projections each having a triangular sectional shape.

FIG. 9 illustrates a structure in which an adhesive is filled into a gap between second projections each having a triangular sectional shape.

A daylighting film 301 illustrated in FIG. 9 includes, on the base member 10, the first projections 11, the projections 22 each having a triangular shape in a cross-section (XZ-section), and the bonding layer 14 formed in a gap 15B that is defined between the projections 22 arranged adjacent to each other in a spaced relation. The base member 10 and the protective base member 13 are bonded to each other by the bonding layer 14.

The spacing between the projections 22 arranged adjacent to each other is the same as that between the second projections 12 arranged adjacent to each other in FIG. 8. However, the gap 15B defined in this embodiment between the projections 22 each having the triangular sectional shape can provide a larger space than that provided by the gap 15A defined between the second projections 12 each having the trapezoidal sectional shape. Thus, since the area of the bonding layer 14 contacting the protective base member 13 is increased, the bonding strength between both base members can be increased.

Figure 10:
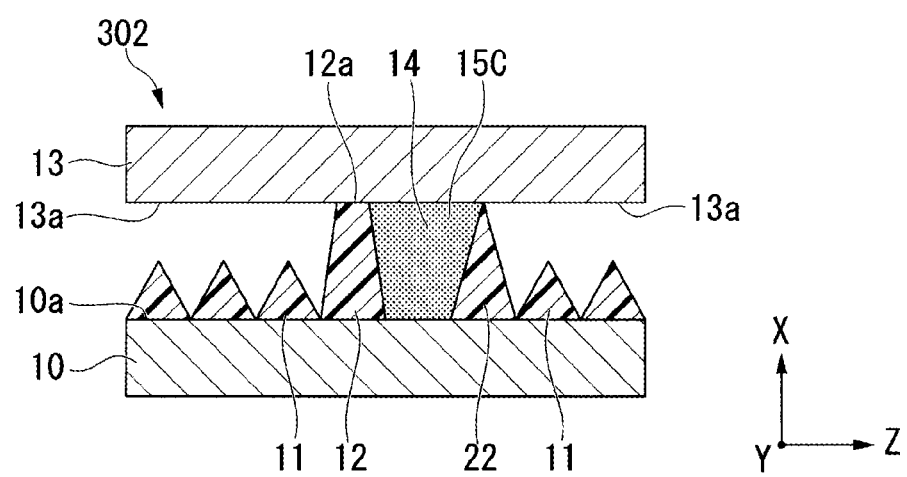
FIG. 10 illustrates a structure in which the adhesive is filled into a gap between second projections having different sectional shapes.

FIG. 10 illustrates a structure in which an adhesive is filled into a gap between second projections having different sectional shapes.

A daylighting film 302 illustrated in FIG. 10 includes, on the base member 10, the first projections 11, the second projections 12 each having the trapezoidal shape in the cross-section (XZ-section), and the projections 22 each having the triangular sectional shape. The base member 10 and the protective base member 13 are bonded to each other by the bonding layer 14 between the second projection 12 and the projection 22 adjacent to each other.

A gap 15C is defined between the second projection 12 and the projection 22 arranged adjacent to each other in a spaced relation. The bonding layer 14 is formed by filling the adhesive into the gap 15C.

Even when the second projection 12 and the projection 22 defining the gap 15C have different shapes as described above, the base member 10 and the protective base member 13 are directly bonded to each other by the bonding layer 14 that is formed in the gap 15C defined between both the projections. Therefore, the bonding between both base members can be made stronger.

Figure 11A:
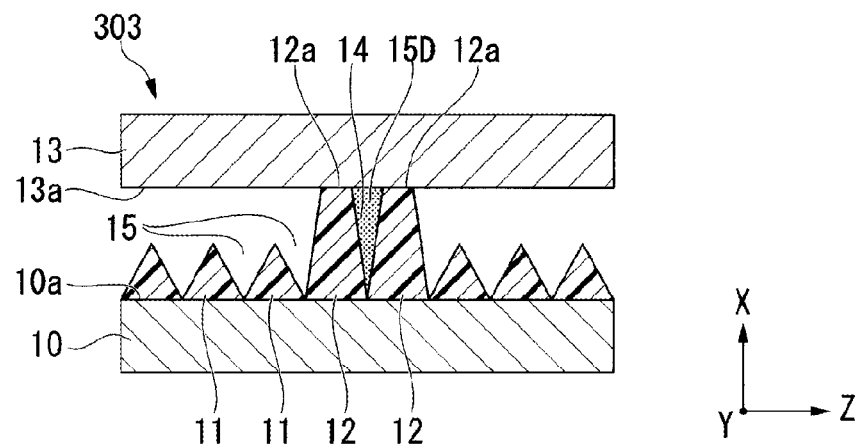
FIG. 11A is a first representation illustrating a structure in which the adhesive is filled into a gap between the second projections arranged adjacent to each other.
Figure 11B:
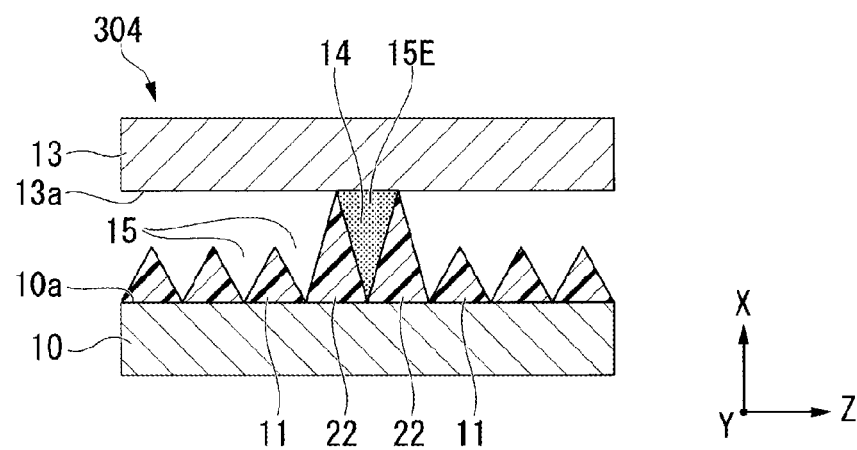
FIG. 11B is a second representation illustrating the structure in which the adhesive is filled into a gap between the second projections arranged adjacent to each other.
Figure 11C:
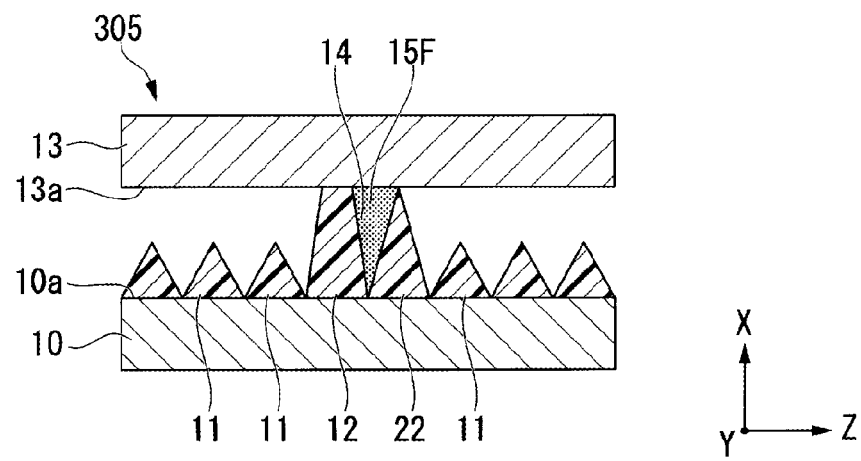
FIG. 11C is a third representation illustrating the structure in which the adhesive is filled into a gap between the second projections arranged adjacent to each other.

FIGS. 11A to 11C are each a representation illustrating a structure in which the adhesive is filled into a gap between the second projections arranged adjacent to each other.

In each of daylighting films 303, 304 and 305 illustrated in FIGS. 11A to 11C, the adjacent projections used for the bonding are arranged contiguously without leaving spacing between the projections at their base ends, and the base member 10 and the protective base member 13 are bonded to each other by the bonding layer 14 formed between the adjacent projections.

In the daylighting film 303 illustrated in FIG. 11A, a gap 15D is defined between a pair of the second projections 12 each having the trapezoidal sectional shape and arranged adjacent to each other. The second projections 12 are bonded to each other and to the protective base member 13 by the bonding layer 14 formed in the gap 15D. As a result, the base member 10 and the protective base member 13 are bonded to each other.

Bonding force between the base member 10 and the protective base member 13 may be increased by applying the adhesive to between the end surfaces 12*a* of the second projections 12 and the inner surface 13*a* of the protective base member 13, to thereby increase the bonding area.

As in the daylighting film 304 illustrated in FIG. 11B, a pair of the projections 22 each having the triangular sectional shape may be arranged adjacent to each other, and the base member 10 and the protective base member 13 may be bonded to each other by forming the bonding layer 14 in a gap 15E defined between the paired projections 22.

As in the daylighting film 305 illustrated in FIG. 11C, the second projections 12 and 22 used for the bonding, which are arranged adjacent to each other, may have different shapes. In this case, the bonding layer 14 is formed in a gap 15F defined between the second projection 12 and the projection 22. The second projection 12 and the projection 22 are bonded to the protective base member 13 by the bonding layer 14, whereby the base member 10 and the protective base member 13 are bonded to each other.

Also in the above case, the adhesive may be further applied to between the end surfaces 12*a* of the second projections 12 and the inner surface 13*a* of the protective base member 13 in order to increase the bonding area.

[Fourth Embodiment]

Figure 12:
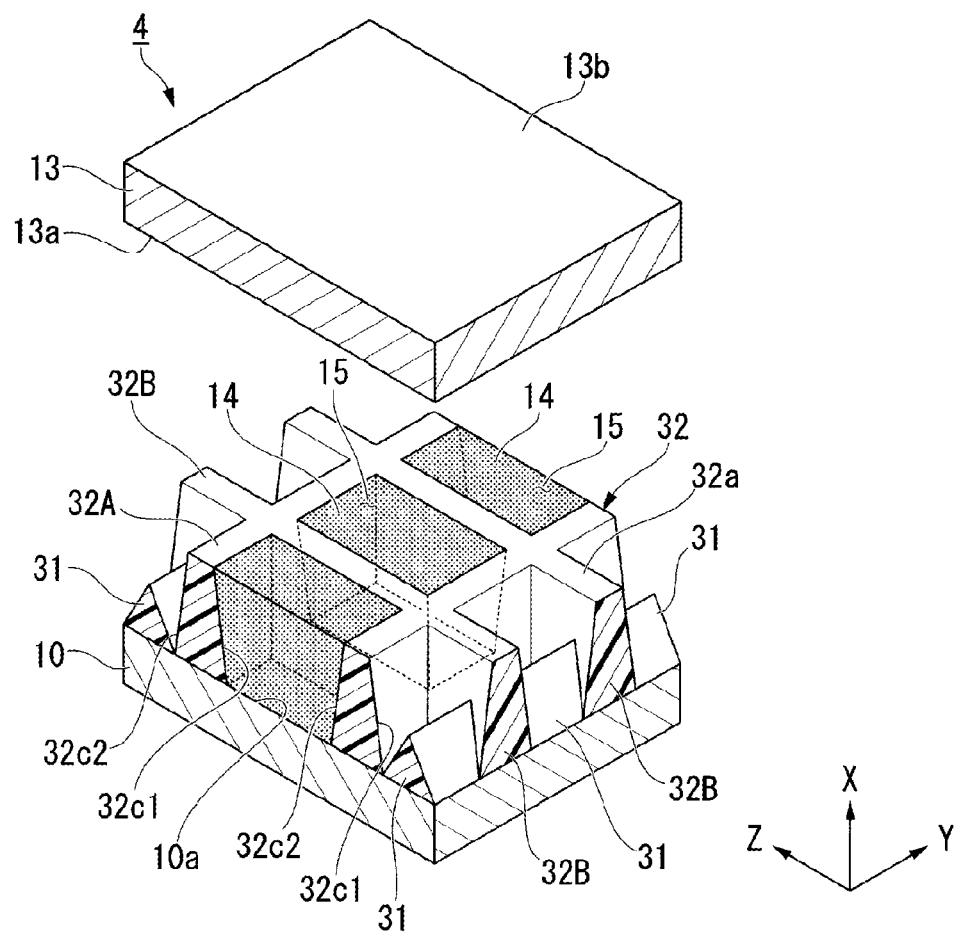
FIG. 12 is a perspective view schematically illustrating a constitution of a daylighting film according to a fourth embodiment.

FIG. 12 is a perspective view schematically illustrating a constitution of a daylighting film according to a fourth embodiment of the present invention.

Figure 13:
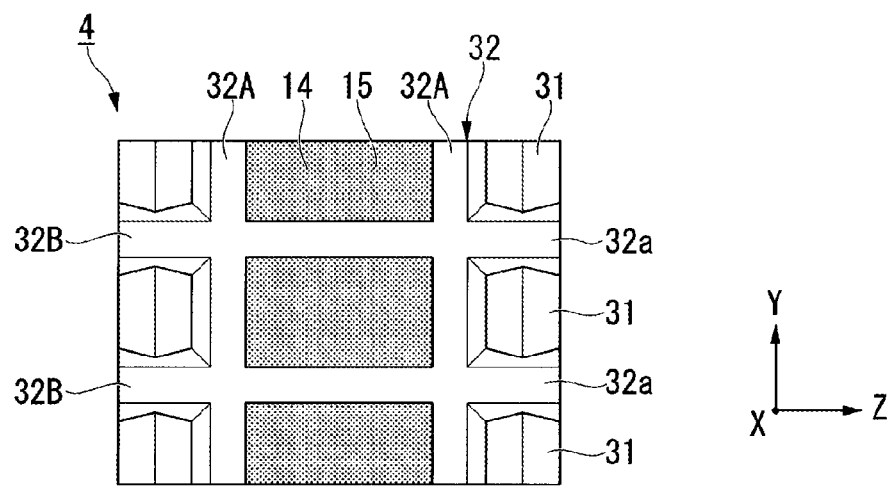
FIG. 13 is a plan view of the daylighting film according to the fourth embodiment.

FIG. 13 is a plan view of the daylighting film according to the fourth embodiment.

It is to be noted that components in the fourth embodiment common to those in the first embodiment are denoted by the same reference signs, and detailed descriptions of those components are omitted.

In a daylighting film 4 according to this embodiment, as illustrated in FIGS. 12 and 13, the bonding layers 14 are formed in gaps 15 that are parts of a space sandwiched between the base member 10 and the protective base member 13, and that are each surrounded by the projections used for the bonding (i.e., the second projections) 32.

On the base member 10, there are formed a plurality of first projections 31 having optical transparency, and the second projections 32 each having a height from the base member 10 higher than that of each first projection 31. The second projections 32 include projected bodies 32A extending in one direction (Y-direction), and projected bodies 32B extending in the Z-direction in a crossing relation to the projected bodies 32A, both the projected bodies being arrayed in a lattice pattern when looked at in a plan view. The plural first projections 31 are arrayed in the Y-direction such that each first projection 31 is positioned between the projected bodies 32B.

The gaps 15 are defined in those ones of regions surrounded by the second projections 32 where the first projections 31 are not present and where recesses are formed to make the inner surface 10*a* of the base member 10 exposed. The bonding layers 14 are formed by filling an adhesive into the gaps 15. The bonding layers 14 are contacted with the base member 10 and the protective base member 13, thereby directly bonding the base member 10 and the protective base member 13 to each other.

Either the gaps 15 (bonding layers 14) or the first projections 31 are arrayed of the base member 10 in the Y-direction with the projected body 32B of the second projection 32 interposed between the gaps 15 or between the first projections 31. Furthermore, the gaps 15 (bonding layers 14) and the first projections 31 are alternately arrayed on the base member 10 in the Z-direction with the projected body 32A of the second projection 32 interposed between the gap 15 and the first projection 31.

Also in this embodiment, the second projections 32 used for the bonding are given with the daylighting function such that one 32*c*2 of lateral surfaces 32*c*1 and 32*c*2 of each second projection 32 functions as a reflective surface.

Therefore, light incident on the outer surface 13*b* of the protective base member 13 comes into the second projection 32 through the lateral surface 32*c*1 of the second projection 32, and is then totally reflected at the reflective surface 32*c*2.

According to this embodiment, as described above, since the base member 10 and the protective base member 13 are bonded to each other by the bonding layers 14 each surrounded by the second projections 32, the bonding layers 14 are not exposed to outdoor air at ends of the daylighting film 4. It is hence possible to avoid deterioration of the bonding layers 14, and to prevent, for example, both the base members from peeling off from the ends of the daylighting film 4. As a result, good bonding between the base member 10 and the protective base member 13 can be maintained for a long term.

While, in this embodiment, the bonding layers 14 and the first projections 31 are alternately arrayed on the base member 10 in the Z-direction with the second projection 32 interposed therebetween, the bonding layers 14 and the first projections 31 may be alternately arrayed on the base member 10 in the Y-direction as well with the second projection 32 interposed therebetween. Moreover, end surfaces 32a of the second projections 32 and the inner surface 13a of the protective base member 13 may be bonded to each other by the adhesive. This enhances the bonding strength because the bonding area with respect to the protective base member 13 is increased.

It is to be noted that the shape of the second projections 32 is not limited to the above-mentioned one insofar as gaps each surrounded by the projections used for the bonding can be formed in the space sandwiched between the base member 10 and the protective base member 13. For example, a plurality of projections each in the form of a circular or rectangular hollow cylinder may be disposed on the base member 10.

[Fifth Embodiment]

Figure 14:
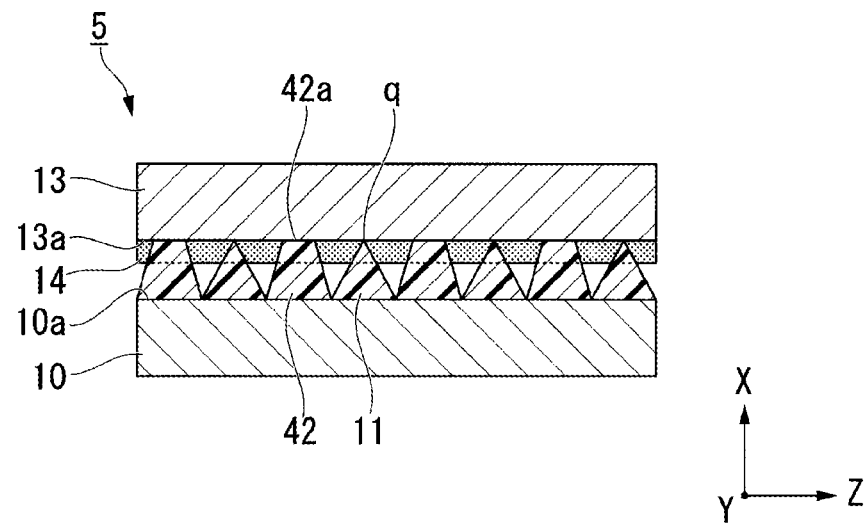
FIG. 14 is a sectional view schematically illustrating a constitution of a daylighting film according to a fifth embodiment.

FIG. 14 is a sectional view schematically illustrating a constitution of a daylighting film according to a fifth embodiment of the present invention.

It is to be noted that components in the fifth embodiment common to those in the first embodiment are denoted by the same reference symbols, and detailed descriptions of those components are omitted.

As illustrated in FIG. 14, a daylighting film 5 according to this embodiment includes, on the inner surface 10a of the base member 10, the first projections 11 having the daylighting function, and second projections 42 used for the bonding and having the same height as the first projections 11. The first projections 11 and the second projections 42 all having the same height are alternately arranged adjacent to each other in the widthwise direction thereof (i.e., in the Z-direction), and are each constituted as a stripe-shaped projection having a lengthwise direction aligned with the Y-direction. The base member 10 and the protective base member 13 are bonded to each other in a state where respective tip portions of the first projections 11 and the second projections 42 are buried in the bonding layer 14. More specifically, in the bonded state, end surfaces 42a of the second projections 42 used for the bonding, each of which has a trapezoidal sectional shape, and tops q of the first projections 11 having the daylighting function, each of which has a triangular sectional shape, are abutted against the inner surface 13a of the protective base member 13.

According to the constitution of this embodiment, since not only the first projections 11 each having the triangular sectional shape, but also the second projections 42 used for the bonding and having the trapezoidal sectional shape are disposed on the base member 10 together, the bonding strength between the base member 10 and the protective base member 13 can be increased in comparison with that obtained with the daylighting film in which only the first projections 11 are present on the base member 10. Moreover, the thickness of the bonding layer 14 can be reduced in comparison with that required in the case of bonding the base member 10 on which only the first projections 11 are present and the protective base member 13. In other words, even when the thickness of the bonding layer 14 is reduced, the bonding strength comparable to that obtained in the case of bonding the base member 10 on which only the first projections 11 are present and the protective base member 13 is obtained.

Figure 15:
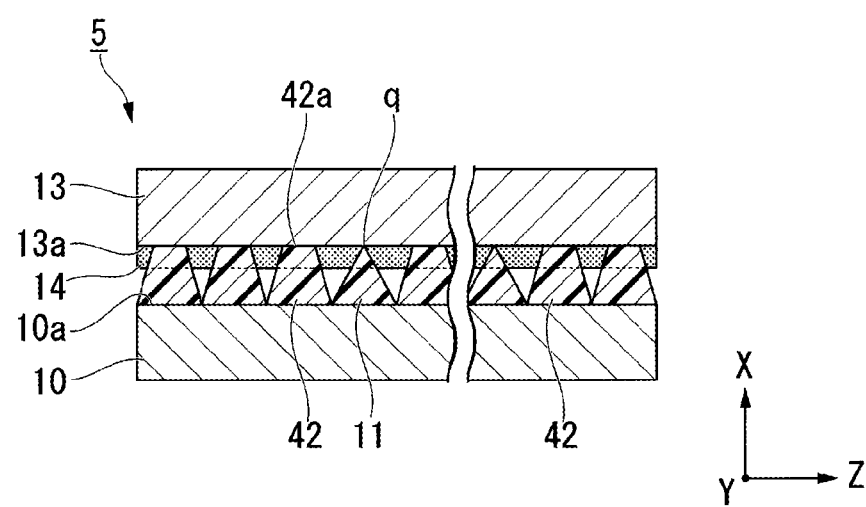
FIG. 15 is a sectional view illustrating an end-side constitution of the daylighting film.

FIG. 15 is a sectional view illustrating an end-side constitution of the daylighting film.

In this embodiment described above, the first projections 11 and the second projections 42 are disposed on the base member 10 in substantially equal number. However, as illustrated in FIG. 15, the number of the second projections 42 used for the bonding may be increased at optional locations, as required, along the space between the base member 10 and the protective base member 13. For example, the number of the second projections 42 may be increased in lateral edge portions of the daylighting film 5. This makes it possible to prevent peeling-off between both the base members, which may start from edges of the daylighting film 5.

Figure 16A:
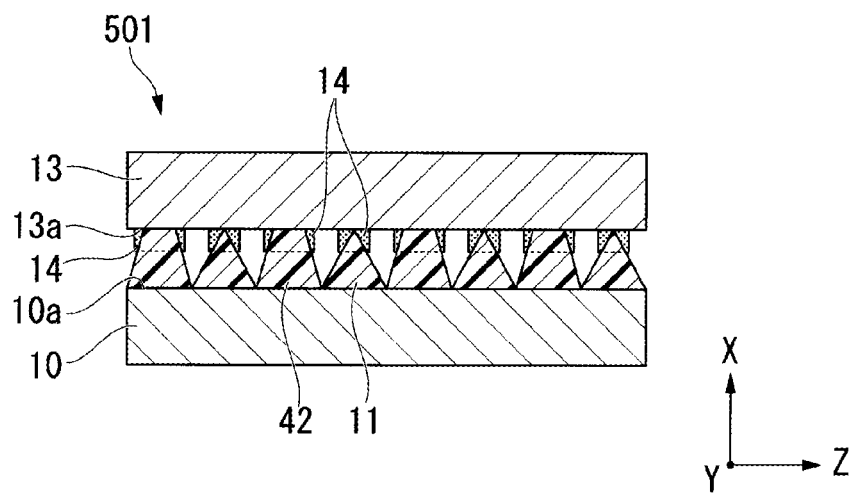
FIG. 16A is a first sectional view illustrating another bonding structure.
Figure 16B:
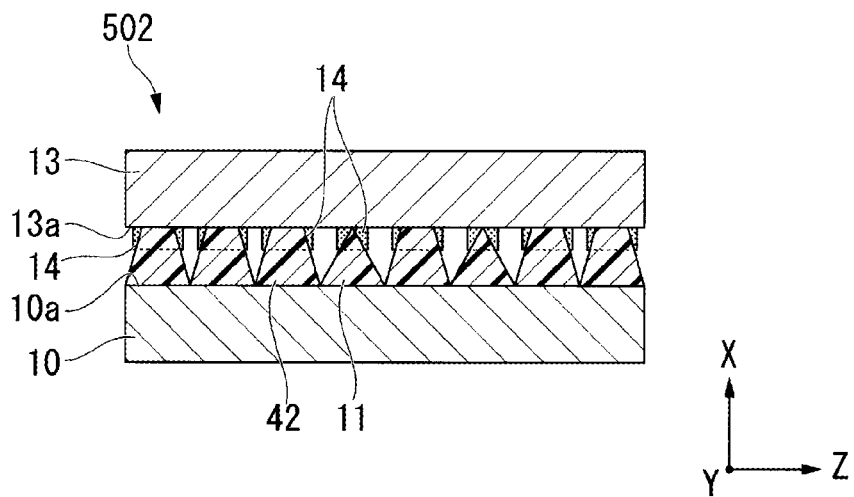
FIG. 16B is a second sectional view illustrating still another bonding structure.

FIGS. 16A and 16B are sectional views illustrating other examples of the bonding structure.

As in daylighting films 501 and 502 illustrated in FIGS. 16A and 16B, the bonding layer 14 may be partly arranged only at a position corresponding to each of the first projections 11 and the second projections 42. With such an arrangement, the base member 10 and the protective base member 13 can be bonded to each other with a smaller amount of the adhesive.

[Sixth Embodiment]

Figure 17:
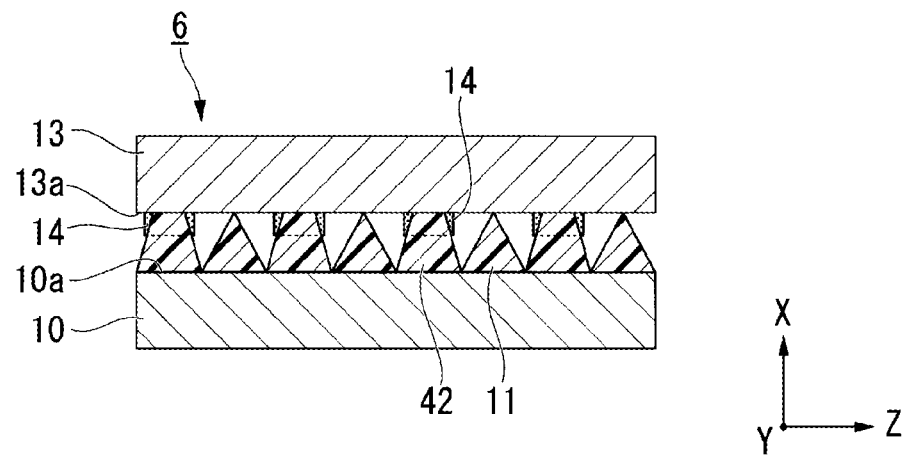
FIG. 17 is a sectional view schematically illustrating one constitution of a daylighting film according to a sixth embodiment.
Figure 18:
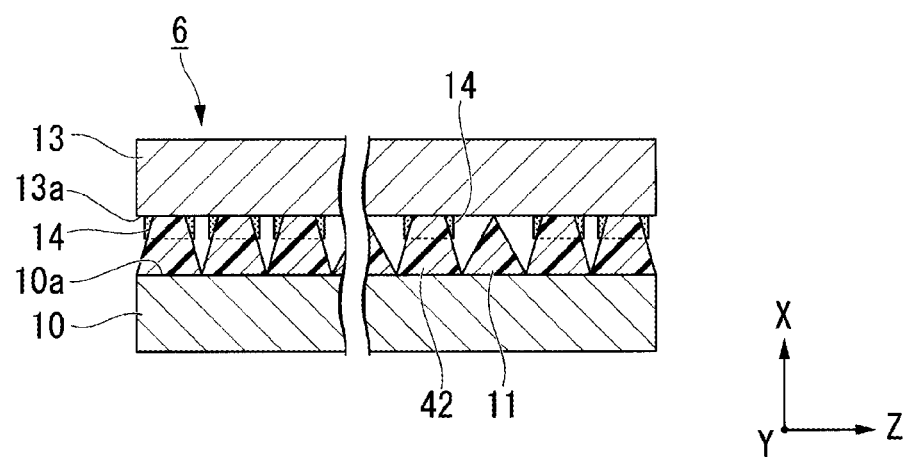
FIG. 18 is a sectional view schematically illustrating another constitution of the daylighting film according to the sixth embodiment.

FIGS. 17 and 18 are each a sectional view schematically illustrating a constitution of a daylighting film according to a sixth embodiment of the present invention.

It is to be noted that components in the sixth embodiment common to those in the first embodiment are denoted by the same reference signs, and detailed descriptions of those components are omitted.

As illustrated in FIGS. 17 and 18, in a daylighting film 6 according to this embodiment, the base member 10 and the protective base member 13 are bonded to each other by the bonding layers 14 disposed corresponding to, among the first projections 11 and the second projections 42 both disposed on the base member 10, only the second projections 42 used for the bonding.

With that constitution, since the tip portions of the first projections 11 are not buried in the bonding layers 14, the daylighting performance of the first projections 11 can be maintained.

A lower limit in the bonding area of the bonding layer 14 with respect to the second projection 42 used for the bonding will be described below.

Figure 19:
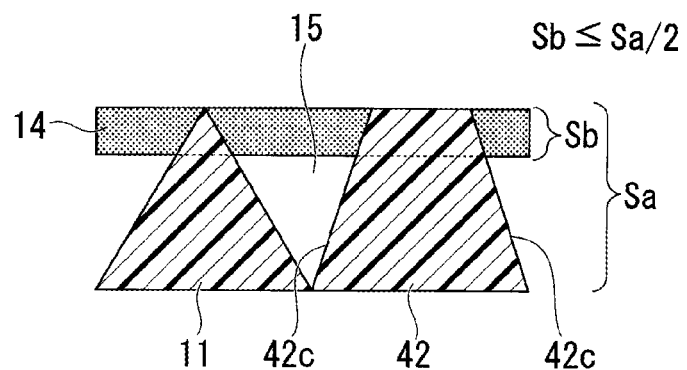
FIG. 19 is an explanatory view referenced to explain a lower limit of a bonding area of the bonding layer with respect to a second projection.

FIG. 19 is an explanatory view referenced to explain the lower limit of the bonding area of the bonding layer 14 with respect to the second projection 42.

When the second projections 42 used for the bonding have the same height as the first projections 11, the respective tip portions of the first projections 11 and the second projections 42 are all buried in the bonding layer 14 in the state where the base member 10 and the protective base member 13 are bonded to each other. The daylighting performance of the first projections 11 and the second projections 42 varies depending on a total surface area of respective inclined surfaces of the first projections 11 and the second projections 42, which are buried in the bonding layer 14. Thus, with the first projections 11 and the second projections 42 buried in the bonding layer 14, the interface between regions having different refractive indices is reduced corresponding to an extent of the buried surface area, whereby the daylighting performance is affected.

In the case of partly forming the bonding layers 14 only at the positions of the second projections 42 used for the bonding as described above, the first projections 11 are not buried in the bonding layers 14. However, because the second projections 42 used for the bonding also have the daylighting function, it is desired to utilize the daylighting performance of the second projections 42 as well.

To that end, the lower limit of the bonding area of the bonding layer 14 with respect to the second projection 42 is specified as follows.

Assuming, as illustrated in FIG. 19, that a surface area of a lateral surface (inclined surface) 42c of the second projection 42 in contact with the gap 15 is denoted by Sa, and a surface area of a portion of the lateral surface 42c, the portion being buried in the bonding layer 14, is denoted by Sb, the thickness of the bonding layer 14 is determined such that a relation of Sb≤Sa/2 is satisfied.

On that condition, since at least ½ of the second projection 42 provides a surface capable of reflecting light, reduction of the daylighting performance of the second projection 42 attributable to the presence of the bonding layer 14 can be suppressed. At the same time, reduction of the daylighting performance of the first projection 11, of which tip portion is buried in the bonding layer 14, can also be suppressed.

It is to be noted that the above-mentioned relation is satisfied in the foregoing embodiments.

[Seventh Embodiment]

Figure 20:
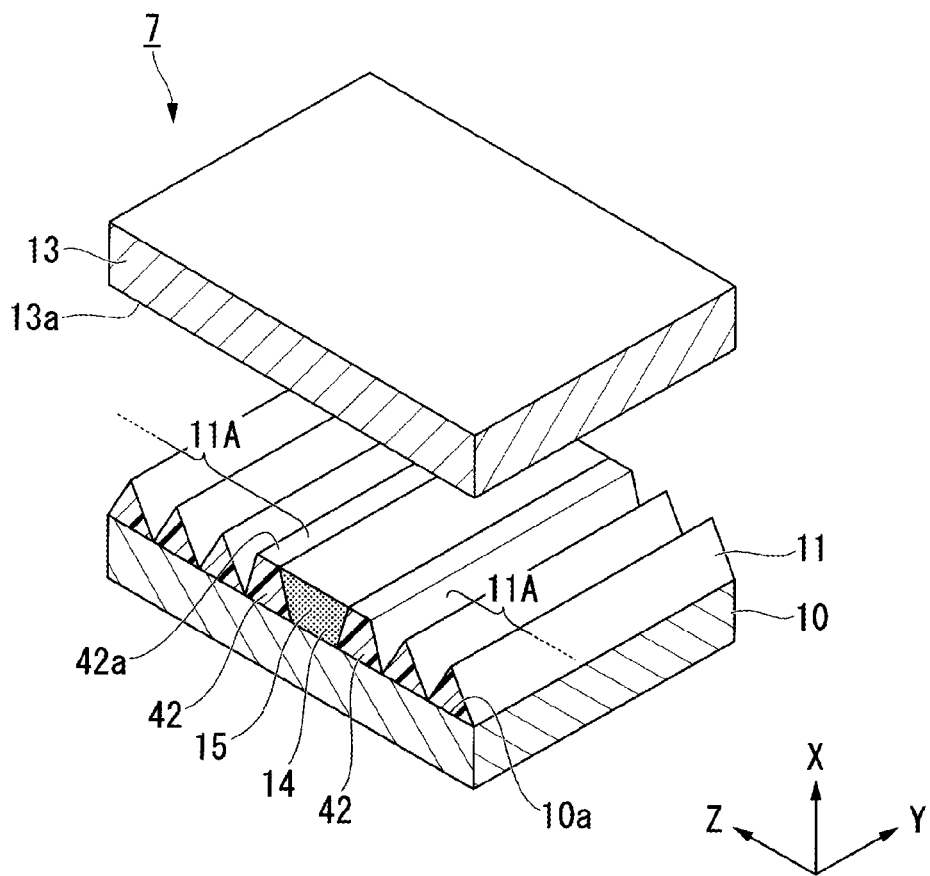
FIG. 20 is a perspective view schematically illustrating a constitution of a daylighting film according to a seventh embodiment.

FIG. 20 is a perspective view schematically illustrating a constitution of a daylighting film according to a seventh embodiment of the present invention.

Figure 21:
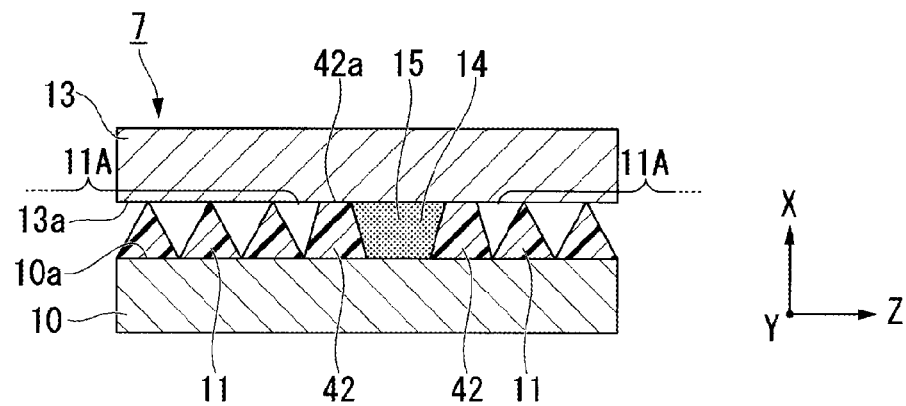
FIG. 21 is a sectional view schematically illustrating the constitution of the daylighting film according to the embodiment.

FIG. 21 is a sectional view schematically illustrating a constitution of the daylighting film according to the seventh embodiment.

It is to be noted that components in the seventh embodiment common to those in the first embodiment are denoted by the same reference symbols, and detailed descriptions of those components are omitted.

A daylighting film 7 illustrated in FIGS. 20 and 21 includes, on the base member 10, the first projections 11 and the second projections 42 all having the same height, a plurality of gaps 15 each defined between the second projections 42 adjacent to each other, and a plurality of bonding layers 14 formed in the gaps 15. The base member 10 and the protective base member 13 are bonded to each other by the bonding layers 14. The second projections 42 are each disposed adjacent to a projection group 11A constituted by the plurality of first projections 11 that are successively disposed on the base member 10. The second projections 42 adjacent to each other are arranged with a predetermined spacing kept therebetween.

By, as described above, setting wider the pitch of the second projections 42 adjacent to each other and applying an adhesive to flow into a region between the second projections 42 to form the bonding layer 14, it is possible to more easily adjust an amount of the adhesive and to more simply form the bonding layer 14 than the case of partly applying the adhesive to the positions corresponding to the second projections 42.

Figure 22:
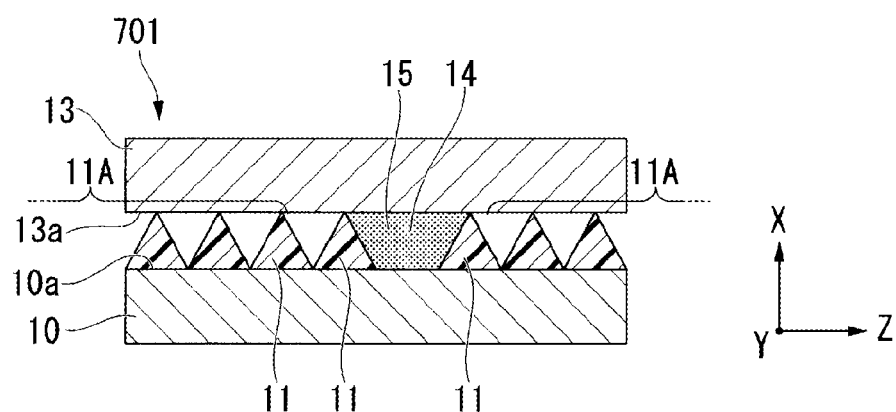
FIG. 22 is a sectional view illustrating another exemplary practical constitution.

FIG. 22 is a sectional view illustrating another exemplary practical constitution.

A daylighting film 701 illustrated in FIG. 22 includes, on the base member 10, only the first projections 11 each having the triangular sectional shape and the daylighting function. The base member 10 and the protective base member 13 are bonded to each other by the bonding layer 14 formed between the adjacent first projections 11 that are arranged in a spaced relation. More specifically, the projection groups 11A are disposed on the base member 10 at a predetermined interval, and the bonding layer 14 is formed by applying the adhesive to flow into a gap 15 that is defined by the projection groups 11A adjacent to each other.

Thus, the bonding structure may be constituted by utilizing only the first projections 11 having the daylighting function.

[Eighth Embodiment]

Figure 23:
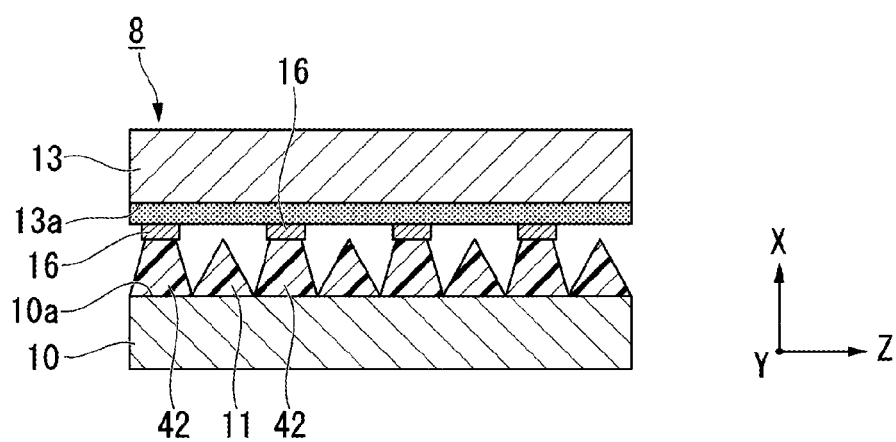
FIG. 23 is a sectional view illustrating a constitution of a daylighting film according to an eighth embodiment.

FIG. 23 is a sectional view illustrating a constitution of a daylighting film according to an eighth embodiment of the present invention.

It is to be noted that components in the eighth embodiment common to those in the first embodiment are denoted by the same reference symbols, and detailed descriptions of those components are omitted.

A daylighting film 8 illustrated in FIG. 23 includes the first projections 11 and second projections 42, which are alternately arranged on the base member 10 in a contiguous relation, and light shielding members 16 arranged respectively on the end surfaces 42a of the second projections 42. The base member 10 and the protective base member 13 are bonded to each other by the bonding layer 14 disposed on the inner surface 13a of the protective base member 13.

Each of the light shielding members 16 is disposed to entirely cover the end surface 42a of the second projection 42, and is formed in a size equal to or larger than that of the end surface 42a.

Figure 24A:
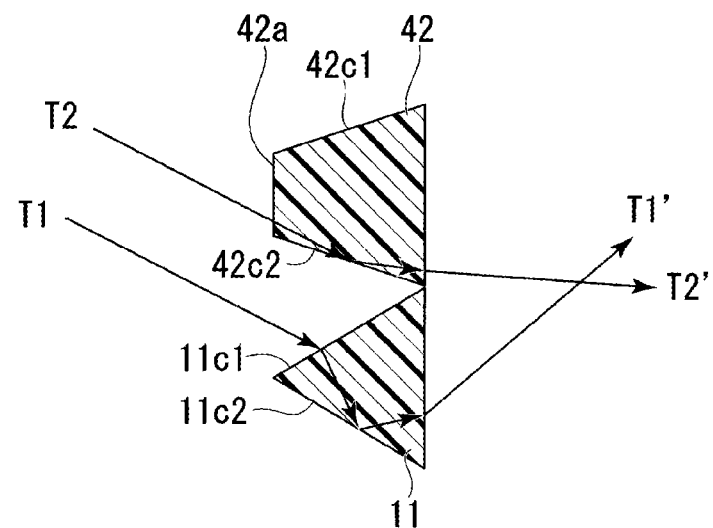
FIG. 24A illustrates a light passing state in the daylighting film provided with no light shielding member.
Figure 24B:
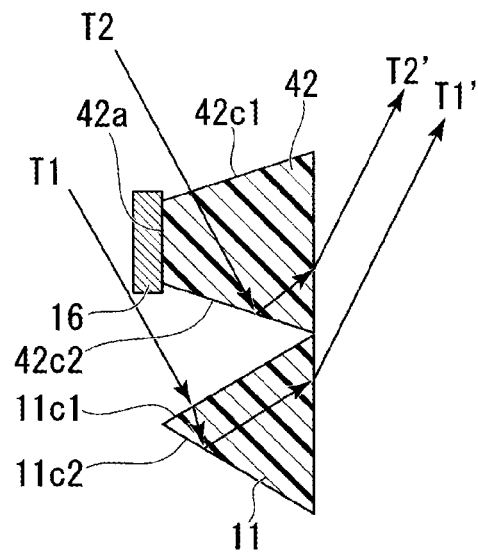
FIG. 24B illustrates a light passing state in the daylighting film provided with a light shielding member.

FIG. 24A illustrates a light passing state in the daylighting film provided with no light shielding member. FIG. 24B illustrates a light passing state in the daylighting film provided with the light shielding member.

As illustrated in FIG. 24A, light T1 (hereinafter referred to as "low-altitude light") incident on the first projection 11 from the sun at a low altitude comes into the first projection 11 through the lateral surface 11c1 of the first projection 11, and after being totally reflected at the reflective surface 11c2, exits as light T1' directing toward the ceiling.

On the other hand, low-altitude light T2 incident on the second projection 42 comes into the second projection 42 through the end surface 42a, and after being totally reflected at the reflective surface 42c2, exits as light T2' directing toward a place other than the ceiling.

As illustrated in FIG. 24B, light T1 (hereinafter referred to as "high-altitude light") incident on the first projection 11 from the sun at a high altitude comes into the first projection 11 through the lateral surface 11c1 of the first projection 11, and after being totally reflected at the reflective surface 11c2, exits as light T1' directing toward the ceiling.

On the other hand, high-altitude light T2 incident on the second projection 42 comes into the second projection 42 through the lateral surface 42c1, and after being totally reflected at the reflective surface 42c2, exits as light T2' directing toward the ceiling.

Thus, in both the light shielding films, the light T1 incident on the first projection 11 exits substantially toward the ceiling without depending on an incident angle of the light T1. However, as illustrated in FIG. 24A, there is a possibility that, of the light incident on the second projection 42 used for the bonding, the low-altitude light T2' may directly come into the eyes of people present in the room and may be perceived as glare. In view of such a possibility, the light shielding member 16 is disposed on the end surface 42a of the second projection 42 to block off the low-altitude light incident on the second projection 42. As a result, the occurrence of glare, etc. can be prevented.

Figure 25:
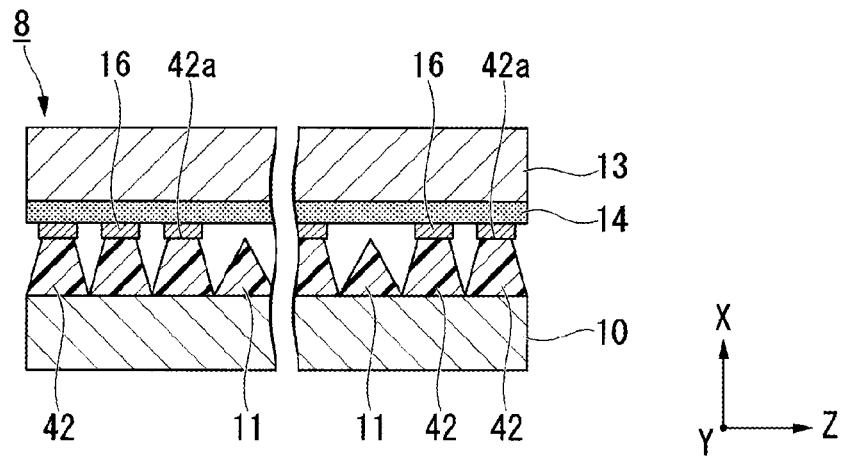
FIG. 25 is a sectional view illustrating an end-side constitution of the daylighting film.

FIG. 25 is a sectional view illustrating an end-side constitution of the daylighting film 8.

As illustrated in FIG. 25, the light shielding member 16 may be disposed on the end surface 42a of each of the second projections 42 used for the bonding, which are disposed in a relatively large number in optional regions, as required, between the base member 10 and the protective base member 13 (e.g., in lateral edge portions of the daylighting film 8). With such an arrangement, even in regions where glare is more apt to occur, the occurrence of the glare can be prevented and the daylighting performance can be enhanced.

Furthermore, when the light shielding members 16 are disposed corresponding to all the second projections 42 present on the base member 10 as in this embodiment, the inside of the room is less viewable from the outdoor, and invasion of privacy is reduced.

[Ninth Embodiment]

Figure 26:
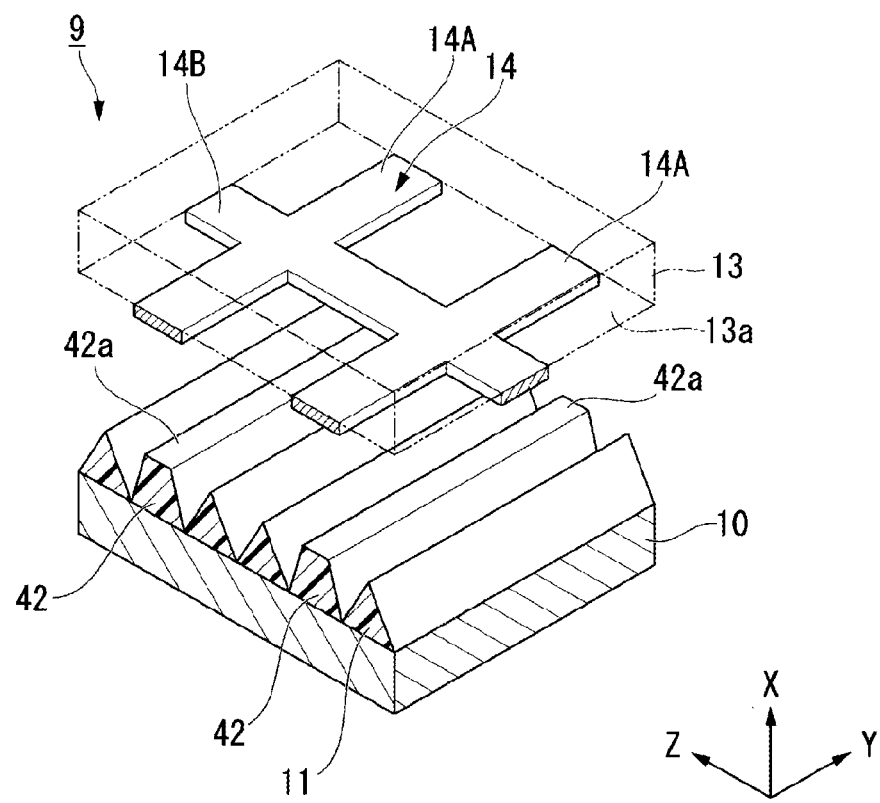
FIG. 26 is a perspective view illustrating a constitution of a daylighting film according to a ninth embodiment.

FIG. 26 is a perspective view illustrating a constitution of a daylighting film according to a ninth embodiment of the present invention.

It is to be noted that components in the ninth embodiment common to those in the first embodiment are denoted by the same reference symbols, and detailed descriptions of those components are omitted.

As in a daylighting film 9 illustrated in FIG. 26, it is not always required that the bonding layer 14 disposed on the protective base member 13 is perfectly matched in position and shape with an array pattern of the second projections 42 disposed on the base member 10. For example, the bonding layer 14 may be constituted by a plurality of bonding portions 14A that are disposed to extend in the lengthwise direction of the second projections 42, and one or more bonding portions 14B that are disposed to extend in a direction crossing the bonding portions 14A in a way of interconnecting the bonding portions 14A.

As a result, even when the position of the protective base member 13 is slightly deviated in the Z-direction relative to the base member 10 in the case of bonding the base member 10 and the protective base member 13 to each other, the bonding strength can be ensured with the provision of the bonding portion(s) 14B. The above-described constitution facilitates positioning of both the base members in a bonding step.

Additionally, the pattern shape of the bonding layer 14 is not limited to the illustrated one.

[Tenth Embodiment]

Figure 27:
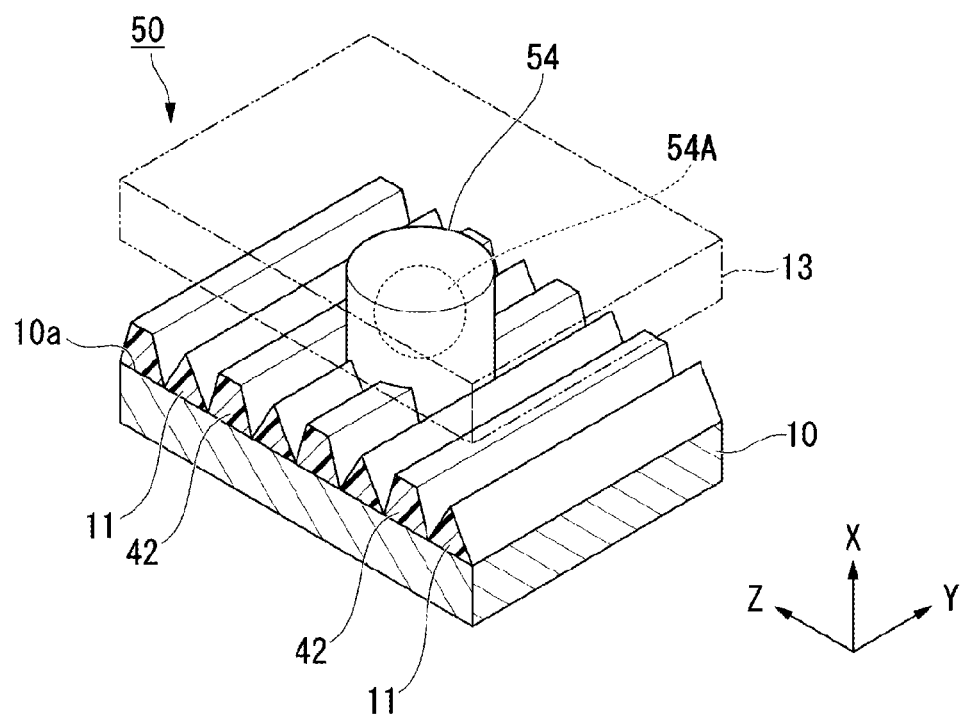
FIG. 27 is a perspective view illustrating a constitution of a daylighting film according to a tenth embodiment.
Figure 28:
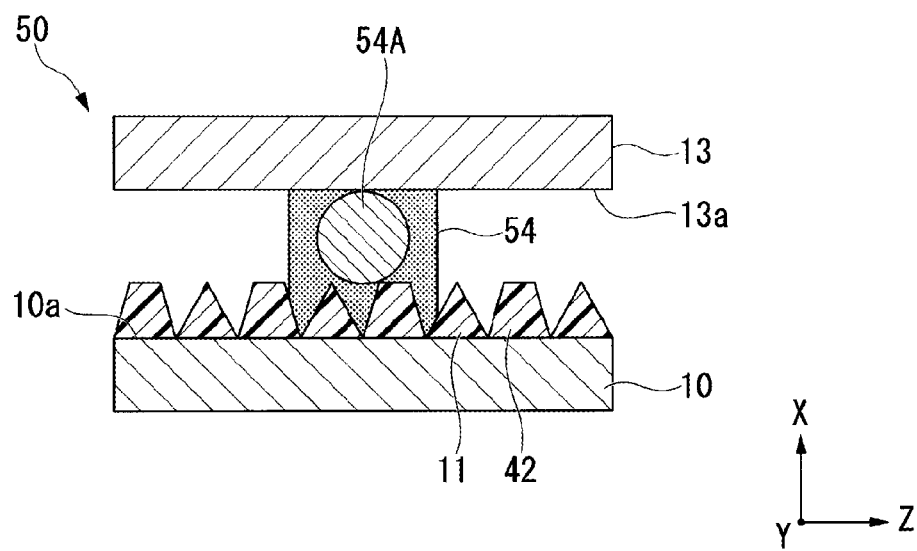
FIG. 28 is a sectional view illustrating the constitution of the daylighting film according to the tenth embodiment.

FIG. 27 is a perspective view illustrating a constitution of a daylighting film according to a tenth embodiment of the present invention. FIG. 28 is a sectional view illustrating a constitution of the daylighting film.

It is to be noted that components in the tenth embodiment common to those in the first embodiment are denoted by the same reference symbols, and detailed descriptions of those components are omitted.

In a daylighting film 50 illustrated in FIG. 27, the base member 10, on which the first projections 11 and the second projections 12 all having the same height are alternately disposed, and the protective base member 13, which is arranged in an opposite relation to the inner surface 10a of the base member 10, are bonded to each other by an adhesive 54 including a spacer 54A.

The spacer 54A included in the adhesive 54 is provided as a spherical body with a diameter having a larger value than the height of the first projections 11 and the second projections 12 and the pitch of the first projections 11 and the second projections 12. On that condition, the spacer 54A can be avoided from entering the gap between the first projection 11 and the second projection 12 adjacent to each other.

The above-described constitution is particularly effective in the case where the projections used for the bonding and being higher than the first projections 11 cannot be formed on the base member 10, because the spacing between the base member 10 and the protective base member 13 is kept by the spacer 54A included in the adhesive 54. Moreover, since the use of the adhesive 54 including the spacer 54A enables the adhesive 54 to be locally arranged in a predetermined region, the number of the first projections 11 contacting the adhesive 54 is reduced. Even when the first projections 11 contact the adhesive 54, only parts of the first projections 11 in the lengthwise direction contact the adhesive 54. Accordingly, the daylighting function of the first projections 11 does not degrade to a large extent.

Figure 29:
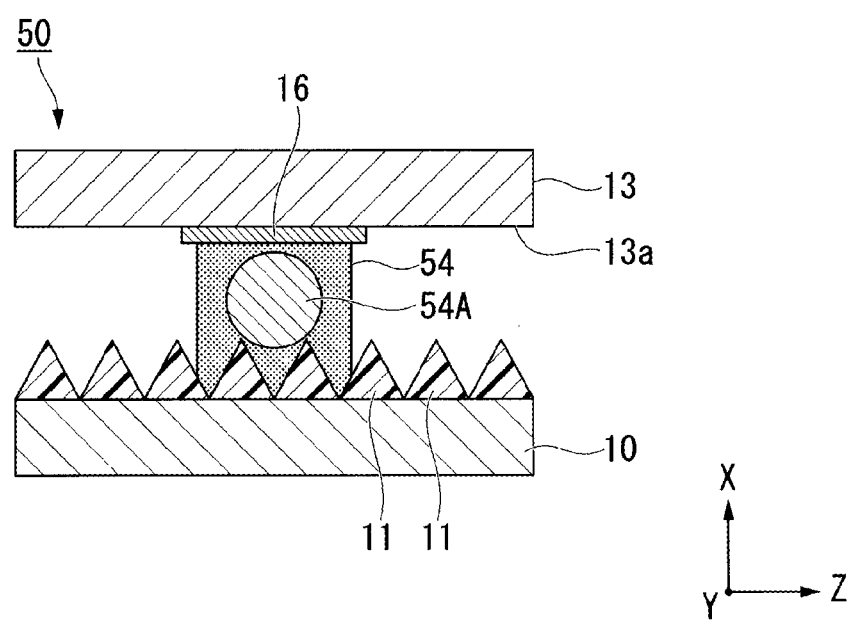
FIG. 29 is a sectional view illustrating a constitution including only first projections.

While, in FIGS. 27 and 28, the first projections 11 and the second projections 12 are disposed together on the base member 10, only the first projections 11 may be disposed on the base member 10 as illustrated in FIG. 29. Furthermore, as illustrated in FIG. 29, the light shielding member 16 may be disposed on the inner surface 13a of the protective base member 13 corresponding to a region of the inner surface 13a bonded by the adhesive 54.

Figure 30A:
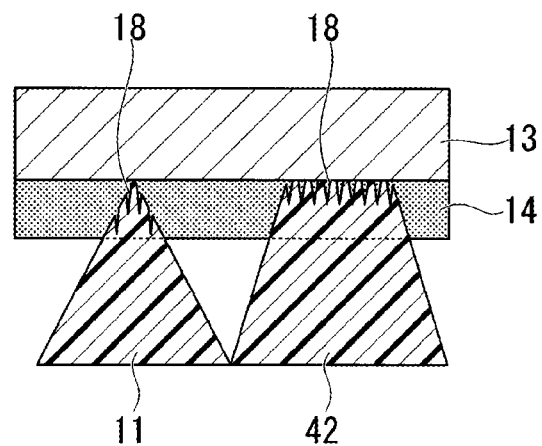
FIG. 30A is a first sectional view illustrating shape examples of tip portions of structural bodies, the tip portions contacting the adhesive.
Figure 30B:
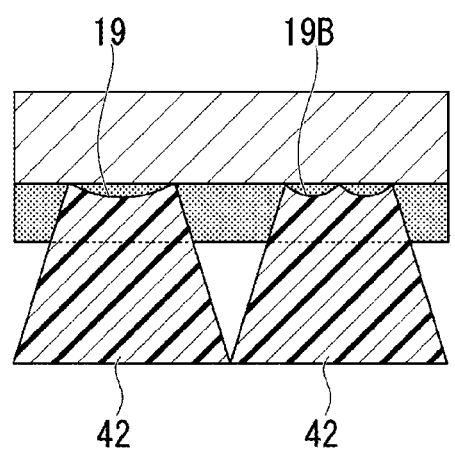
FIG. 30B is a second sectional view illustrating other shape examples of tip portions of the structural bodies, the tip portions contacting the adhesive.

FIGS. 30A and 30B are each a sectional view illustrating shape examples of tip portions of structural bodies, the tip portions contacting the adhesive.

As illustrated in FIG. 30A, an irregular surface having many fine irregularities 18 may be formed in each tip portion (end portion on the side close to the protective base member 13) of the first projections 11 and the second projections 42, the tip portion contacting the bonding layer 14. Alternatively, as illustrated in FIG. 30B, an uneven surface 19A constituted by a gently curved surface, or an uneven surface 19B constituted by a plurality of curved surfaces may be provided in the tip portion of the second projection 42.

Since the shape of the tip portion is made non-straight by, as described, forming the irregular or uneven surface in the tip portion of each of the first projections 11 and the second projection 42 used for the bonding, the tip portion contacting the bonding layer 14, it is possible to increase the bonding area with respect to the bonding layer 14, and to enhance the bonding strength.

[Eleventh Embodiment]

Figure 31:
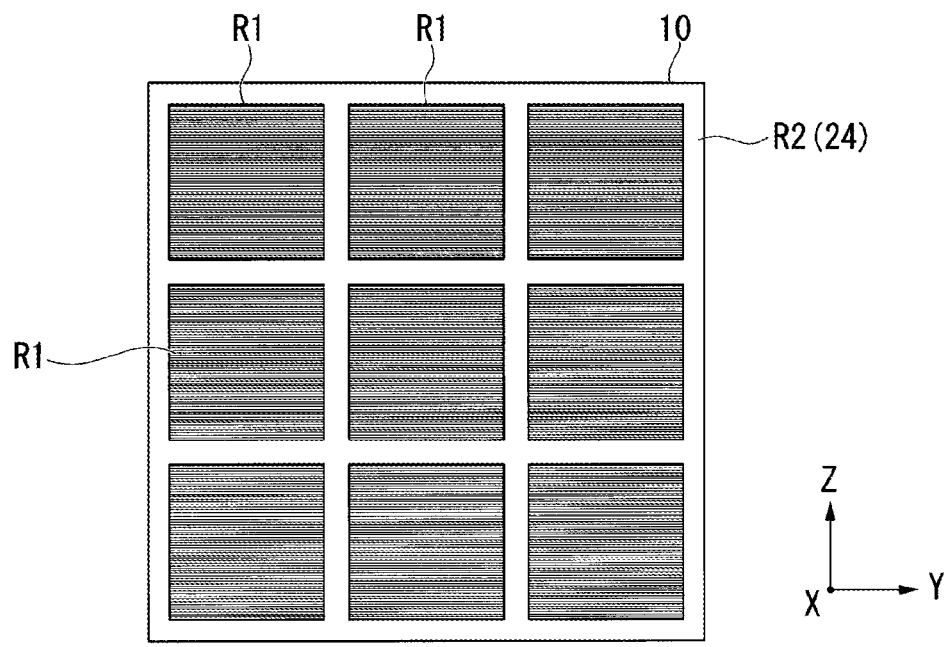
FIG. 31 partly illustrates a constitution of a daylighting film according to an eleventh embodiment.

FIG. 31 partly illustrates a constitution of a daylighting film according to an eleventh embodiment.

As illustrated in FIG. 31, a plurality of projection forming regions R1 are disposed on the base member 10 at predetermined intervals in the Z-direction and the Y-direction. In each of the projection forming regions R1, the first projections 11 and the second projections 12 are alternately arrayed in the Z-direction. A region between the projection forming regions R1 adjacent to each other serves as a bonding region R2 where the base member 10 and the protective base member 13 are directly contacted with each other with an adhesive interposed therebetween, and where neither the first projections 11 nor the second projections 12 are present.

The adhesive applied to the bonding region R2 may be any type of adhesive that is transparent, opaque, or colored. Since a bonding layer 24 formed in the bonding region R2 is made transparent, opaque, or colored depending on a color of the adhesive applied to the bonding region R2, a specific or aesthetic impression in design of the daylighting film can be improved.

Additionally, in the projection forming regions R1, the bonding layers 14 are each present in the gap 15 defined between the first projection 11 and the second projection 12. A color of the adhesive forming those bonding layers 14 can also be changed, as required, depending on the color in the bonding region R2.

[Twelfth Embodiment]

Figure 32:
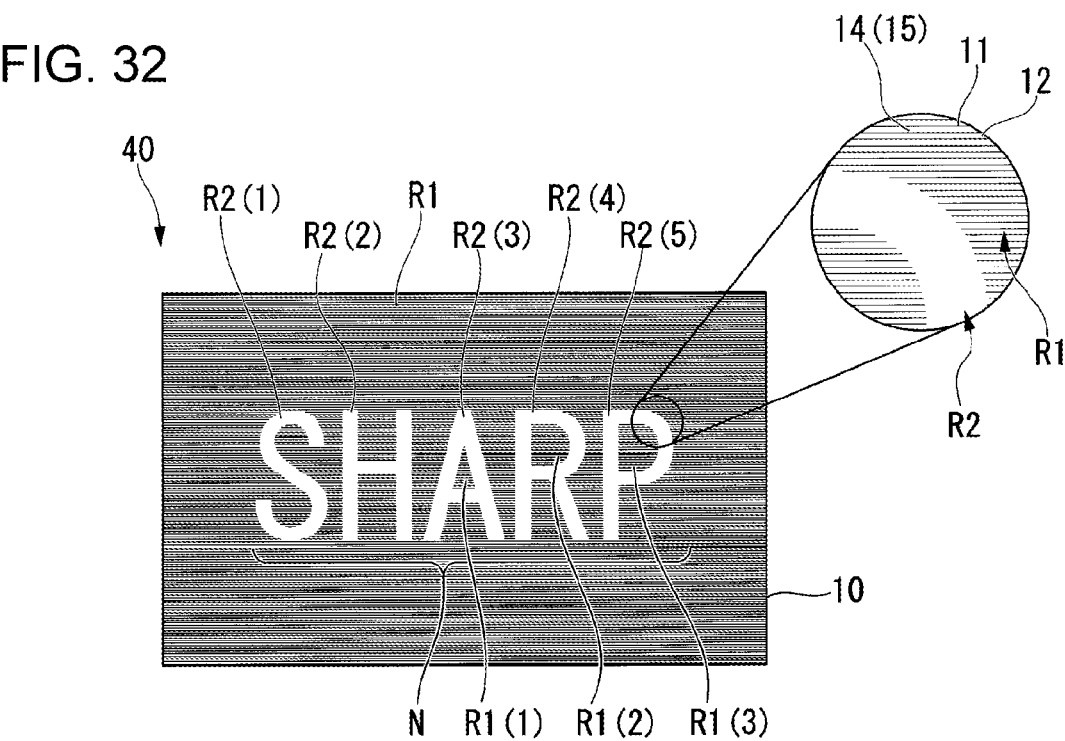
FIG. 32 illustrates a constitution of a daylighting film according to a twelfth embodiment, and represents a practical example in which the daylighting film is given with a specific or aesthetic impression in design.

FIG. 32 illustrates a constitution of a daylighting film according to a twelfth embodiment, and represents a practical example in which the daylighting film is given with a specific or aesthetic impression in design.

A daylighting film 40 illustrated in FIG. 32 includes, on the base member 10, a plurality of projection forming regions R1 where the first projections 11 and the second projections 12 are arrayed, a plurality of bonding regions R2(1) to R2(5), and projection forming regions R1(1), R1(2) and R1(3) that are surrounded by the bonding regions R2(3), R2(4) and R2(5), respectively. In the illustrated example, the bonding regions R2(1) to R2(5) are arranged so as to express a character string of "SHARP". In the case of employing the transparent adhesive, the bonding regions R2(1) to R2(5) have high transparency because the first projections 11 and 12 are not present therein, whereas the projection forming regions R1 and R1(1) to R1(3) other than the bonding regions R2(1) to R2(5) appear with diffused light. Accordingly, the character string of "SHARP" is visually recognized by a person looking at the daylighting film 40 as if the characters are three-dimensionally popped up.

Colors of the character string can be optionally changed by appropriately employing various colored adhesives corresponding to the bonding regions. Hence the aesthetic impression in design can be improved.

It is to be noted that, in addition to characters, pictures, figures, etc. can also be expressed with the bonding regions R2.

[Thirteenth Embodiment]

Figure 33:
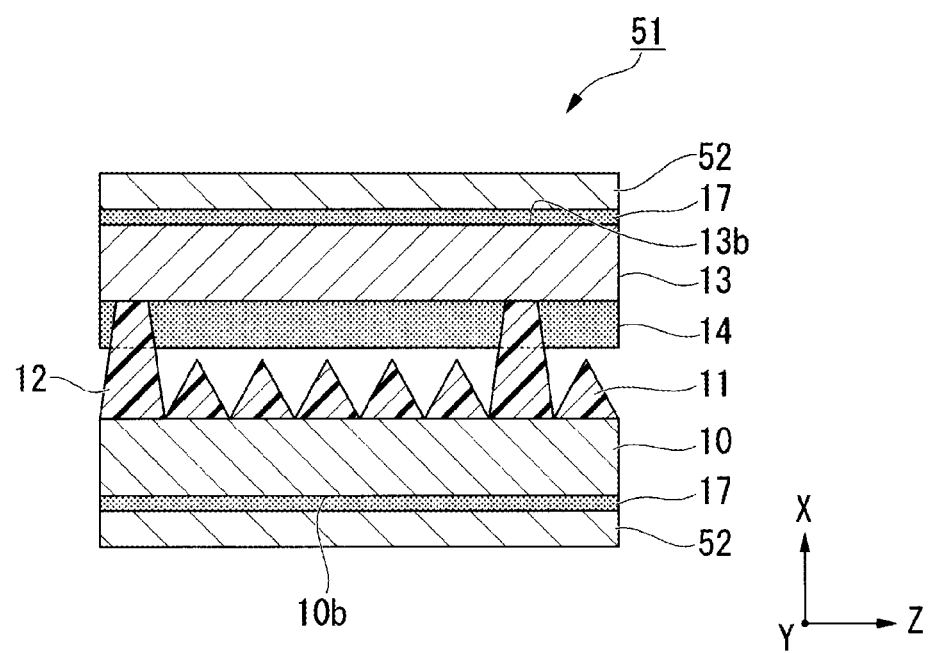
FIG. 33 illustrates a constitution of a daylighting film according to a thirteenth embodiment.

FIG. 33 illustrates a constitution of a daylighting film according to a thirteenth embodiment.

In a daylighting film 51 illustrated in FIG. 33, separate films 52 are laminated on the front and rear sides of the daylighting film 51.

The separate films 52 are laminated on the outer surface 10b of the base member 10 and the outer surface 13b of the protective base member 13 with a sticky layer 17 interposed between the separate film 52 and each outer surface, thereby protecting the outer surface 10b of the base member 10 and the outer surface 13b of the protective base member 13. In use, the separate films 52 are kept intact until the daylighting film 51 is pasted to, e.g., a window glass by a user, and just before the daylighting film 51 is pasted, the separate films 52 are peeled off from the base member 10 and the protective base member 13.

The sticky layers 17 are peeled off from the base member 10 and the protective base member 13 together with the separate films 52. Upon peeling-off of the separate films 52, the outer surface 10b of the base member 10 and the outer surface 13b of the protective base member 13 are exposed.

The sticky layer 17 is not always required to be peeled off together with the separate film 52. For example, the separate film 52 disposed on the daylighting film 51 at the side pasted to the window glass (e.g., the side including the protective base member 13) is preferably peeled off just itself. Stated in another way, by making only the separate film 52 at the side pasted to the window glass peelable while the sticky layer 17 remains on the protective base member 13, the daylighting film 51 can be pasted to the window glass through the remaining sticky layer 17. On the other hand, the sticky layer 17 coated on the base member 10 is desirably peeled off together with the separate film 52.

Alternatively, in the case of pasting the daylighting film 51 in a state where the side including the base member 10 is positioned to face the window glass, it is desirable that the sticky layer 17 is left remained on the base member 10 even after peeling off the separate film 52, and that the sticky layer 17 coated on the protective base member 13 is peeled off together with the separate film 52.

In the case of pasting the daylighting film 51 to the window glass with the aid of the sticky layer 17, the sticky layer 17 is made of a material having optical transparency. More preferably, the sticky layer 17 has such a property as enabling, after pasting the daylighting film 51 to the window glass, the relevant daylighting film 51 to be once peeled off and then pasted again for position adjustment.

The separate film 52 may be one of films known in the art. For example, a resin film of, e.g., polyethylene terephthalate or polypropylene may be used as the separate film 52. A thickness of the separate film 52 is usually about 10 to 200 µm.

(Manufacturing Apparatus)

Figure 34:
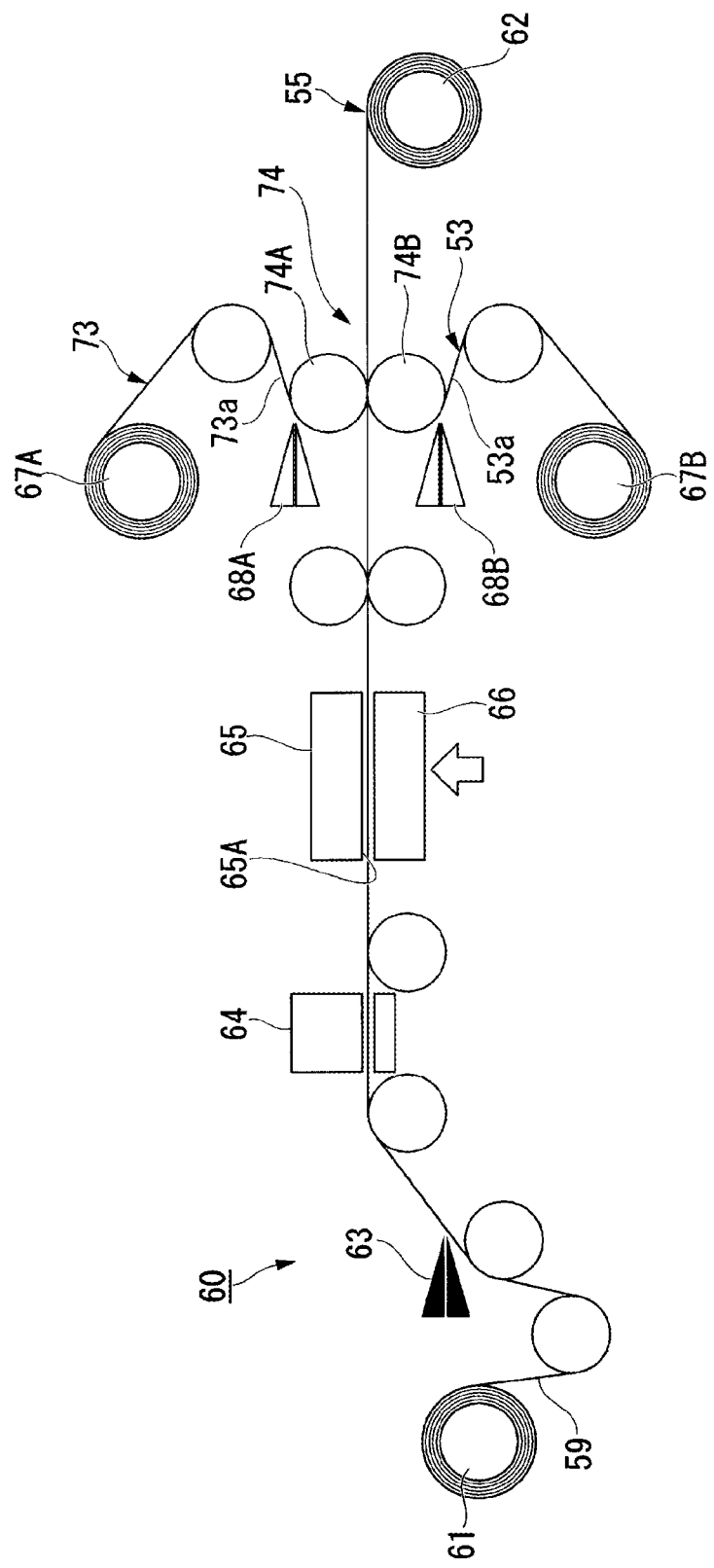
FIG. 34 is a schematic view illustrating one example of a manufacturing apparatus that is used to manufacture the daylighting film according to the thirteenth embodiment.

FIG. 34 is a schematic view illustrating one example of a manufacturing apparatus that is used to manufacture the daylighting film according to the thirteenth embodiment.

In a manufacturing apparatus 60 illustrated in FIG. 34, a long base material 59, which is a mother material of the base member 10 in the daylighting film 51, is conveyed along a roll-to-roll line, and various processes are carried out while the base material 59 is conveyed. Furthermore, in the manufacturing apparatus 60, the first projections 11 and the second projections 12 are formed by employing a plate-shaped projection forming die 65.

As illustrated in FIG. 34, the manufacturing apparatus 60 includes, at one end, a first delivery roller 61 for delivering the base material 59, and at the other end, a wind-up roller 62 for winding up the base material 59.

The base material 59 is moved from the first delivery roller 61 toward the wind-up roller 62.

Above the moving base material 59, a coating device 63, a drying device 64, the projection forming die 65, a press-bonding device 74 are successively disposed from the side closer to the first delivery roller 61 toward the wind-up roller 62.

An irradiation device 66 is disposed under the projection forming die 65 with the base material 59 interposed therebetween. Midway a conveying path of the base material 59, one pair of second delivery roller 67A and adhesive coating device 68A are disposed above the base material 59. Another pair of second delivery roller 67B and adhesive coating device 68B are disposed under the second delivery roller 67A and the adhesive coating device 68A, respectively, with the base material 59 interposed therebetween.

The second delivery roller 67A delivers a long protective mother base material 73, which is a mother material of the protective base member 13, toward a surface of the base material 59. A film base material 53, which is a mother material of the separate film 52, is previously bonded to an outer surface 73b of the protective mother base material 73 with the sticky layer 17 interposed therebetween. In other words, the protective mother base material 73 including the film base material 53 is wound over the second delivery roller 67A.

The second delivery roller 67B delivers, toward a rear surface of the base material 59, a long film base material 53 that is a mother material of the separate film 52 to be bonded to the outer surface 10b of the base member 10 illustrated in FIG. 33.

The adhesive coating device 68A applies an adhesive to be coated over an inner surface 73a (i.e., a surface on the side facing the front surface of the base material 59) of the protective mother base material 73 that has been delivered from the second delivery roller 67A.

The adhesive coating device 68B applies an adhesive to be coated over an inner surface 53a (i.e., a surface on the side facing the rear surface of the base material 59) of the film base material 53 that has been delivered from the second delivery roller 67B.

The projection forming die 65 is a plate-shaped die having, in its surface, a transfer pattern 65A corresponding to a concave-convex structure of the base member 10 in the daylighting film 51. Thus, the transfer pattern 65A reversed to a concave-convex pattern provided by the first projections 11 and the second projections 12 is formed on the surface of the projection forming die 65, the relevant surface facing the base material 59.

The base material 59 serves as an underlying member on which materials of the first projections 11 and the second projections 12 are coated, and it has heat resistance and mechanical strength that are required during a heat treatment step in a manufacturing process. However, a thickness of the base material 59 is preferably as thin as possible to such an extent that the heat resistance and the mechanical strength are not reduced. The total light transmittance of the base material 59 is preferably 90% or more in accordance with the stipulation of JIS K7361-1.

Sufficient optical transparency can be obtained on the condition that the total light transmittance is 90% or more.

In the case of manufacturing the daylighting film 51, a stock roll 55 in the form of a roll having a plurality of daylighting-film formation regions is first fabricated by the above manufacturing apparatus 60. The many daylighting films 51 are then obtained by cutting the fabricated stock roll 55 into individual films.

(Method of Manufacturing Daylighting Film)

A method of manufacturing the daylighting film of this embodiment will be described below. Here, the manufacturing method is described primarily in connection with a process of manufacturing a stock roll having a large number of daylighting-film formation regions.

FIGS. 35A to 35D are sectional views referenced to successively explain the process of manufacturing the stock roll. FIGS. 36A and 36B are also sectional views referenced to successively explain the process of manufacturing the stock roll. It is to be noted that FIGS. 35A to 35D, 36A and 36B are sectional views taken along a widthwise direction of the base material 59. In the description below, FIG. 34 is also referenced as required.

Figure 35A:
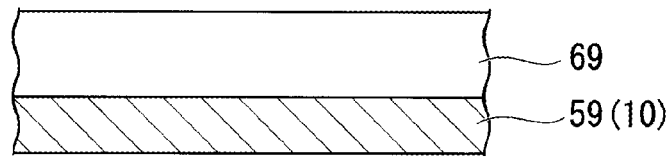
FIG. 35A is a first sectional view referenced to successively explain a process of manufacturing a stock roll.
Figure 36A:
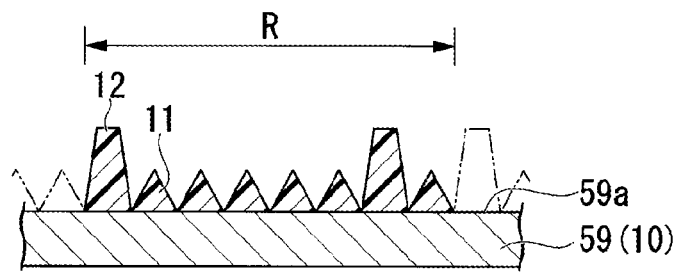
FIG. 36A is a first sectional view of a base material 59 in a widthwise direction.
Figure 36B:
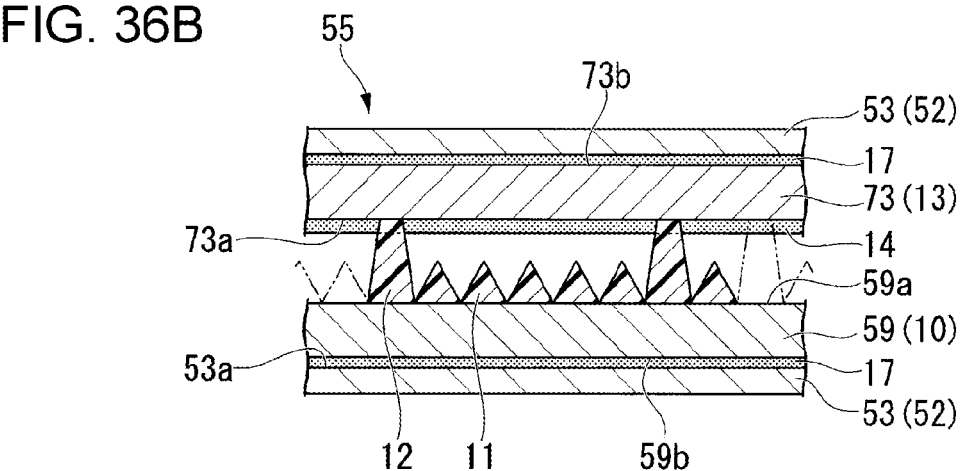
FIG. 36B is a second sectional view of the base material 59 in a widthwise direction.

First, as illustrated in FIGS. 34 and 35A, a photosensitive resin 69 is coated by the coating device 63 in a predetermined film thickness over one surface of the base material 59, which has been delivered from the first delivery roller 61. The photosensitive resin is provided as an organic material having optical transparency and photosensitivity, such as an acrylic resin or an epoxy resin.

Figure 35B:
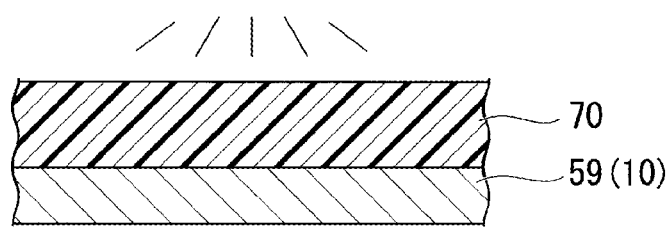
FIG. 35B is a second sectional view referenced to successively explain the process of manufacturing the stock roll.

Next, as illustrated in FIGS. 34 and 35B, the coated photosensitive resin 69 is dried by the drying device 64 to form a coating film (hereinafter referred to as a "photosensitive resin layer 70").

Figure 35C:
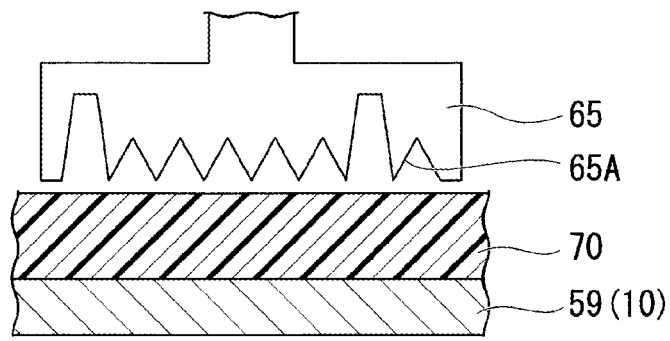
FIG. 35C is a third sectional view referenced to successively explain the process of manufacturing the stock roll.

Next, as illustrated in FIGS. 34 and 35C, the projection forming die 65 having the transfer pattern 65A in its surface, which is reversed to the concave-convex shape defined by the first projections 11 and the second projections 12, is pressed against the photosensitive resin layer 70.

Figure 35D:
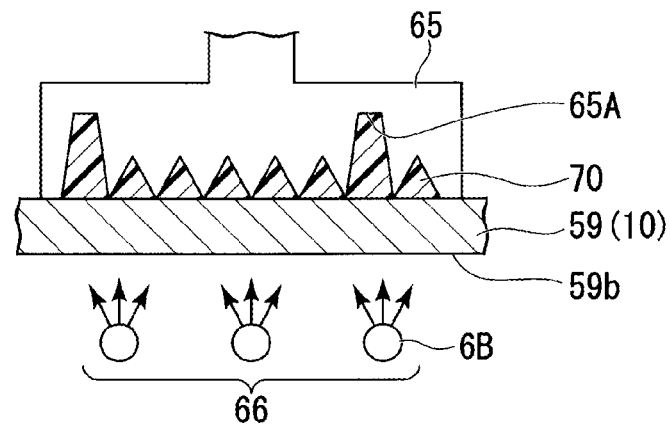
FIG. 35D is a fourth sectional view referenced to successively explain the process of manufacturing the stock roll.

Next, as illustrated in FIGS. 34 and 35D, an outer surface 59b of the base material 59 is irradiated with an active energy ray by employing the irradiation device 66 in a state where the surface of the projection forming die 65 is pressed against the photosensitive resin layer 70. In this embodiment, the photosensitive resin layer 70 is cured by irradiating ultraviolet rays from light sources 6B of the irradiation device 66.

Next, as illustrated in FIGS. 34 and 36A, the projection forming die 65 is raised to peel off the base material 59 from the projection forming die 65. The surface shape of the projection forming die 65 is thus transferred to the surface of the photosensitive resin layer 70. As a result, the daylighting-film formation regions R including the first projections 11 and the second projections 12 are formed in a surface 59a of the long base material 59.

Next, as illustrated in FIGS. 34 and 36B, the protective mother base material 73 including the film base material 53 bonded to its outer surface 73b is delivered from the second delivery roller 67A that is disposed on the side above the front surface of the base material 59. The adhesive is then coated by the adhesive coating device 68 in the predetermined film thickness over the inner surface 73a of the protective mother base material 73, which has been delivered from the second delivery roller 67A, to form the bonding layer 14.

On the other hand, the film base material 53 is delivered from the second delivery roller 67B that is disposed on the side under the rear surface of the base material 59. The adhesive is then coated by the adhesive coating device 68 in the predetermined film thickness over the inner surface 53a of the film base material 53, which has been delivered from the second delivery roller 67B, to form the sticky layer 17.

Thereafter, by employing the press-bonding device 74 constituted by a pair of nip rolls 74A and 74B, etc., the protective mother base material 73 with the bonding layer 14 oriented to face the base material 59 is bonded to the surface 59a of the base material 59, on which the first projections 11 and the second projections 12 are formed, with the first projections 11 and the second projections 12 interposed therebetween. On the other hand, the film base material 53 with the bonding layer 14 oriented to face the base material 59 is bonded to the outer surface 59b of the base material 59. In such a way, the stock roll 55 is manufactured.

The manufactured stock roll 55 is once wound over the wind-up roller 62. The daylighting film 51 of this embodiment, illustrated in FIG. 36B, is then obtained by cutting the stock roll 55, wound off from the wind-up roller 62, for each daylighting-film formation region R illustrated in FIG. 36A.

According to this embodiment, the daylighting film 51 can be distributed to the market in a state that the front and rear sides of the daylighting film 51 are protected by the separate films 52. Since the front and rear sides of the daylighting film 51 are protected by the separate films 52 until just before the daylighting film 51 is pasted to, e.g., a window glass by the user, the surfaces of the base member 10 and the protective base member 13 can be prevented from being damaged during transportation, for example. Accordingly, the daylighting film 51 can be satisfactorily bonded to the window glass, etc., and sufficient daylighting function can be developed.

[Fourteenth Embodiment]

Figure 37:
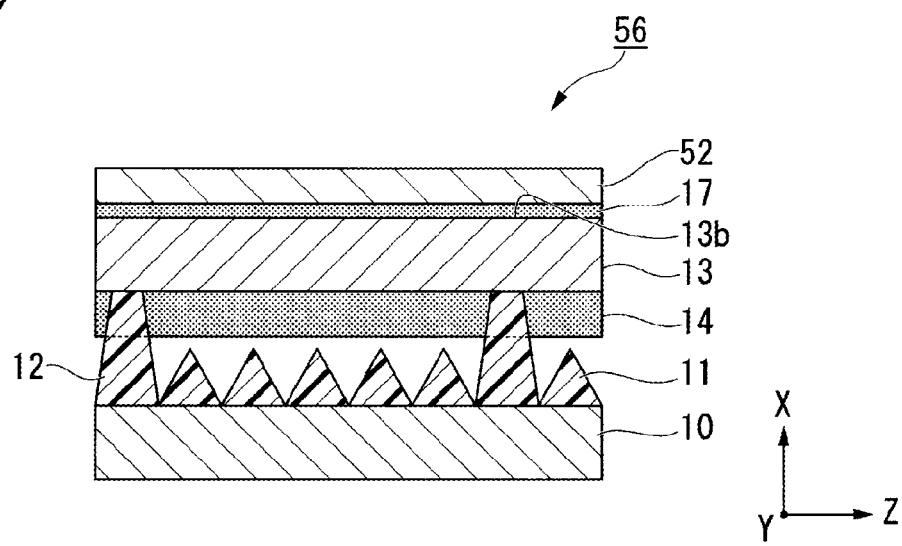
FIG. 37 illustrates a constitution of a daylighting film according to a fourteenth embodiment.

FIG. 37 illustrates a constitution of a daylighting film according to a fourteenth embodiment.

In a daylighting film 56 illustrated in FIG. 37, the separate film 52 is laminated only on one surface side of the daylighting film 56. More specifically, the separate film 52 is laminated on the outer surface 13b of the protective base member 13 in the daylighting film 56 with the sticky layer 17 interposed therebetween.

(Manufacturing Apparatus)

Figure 38:
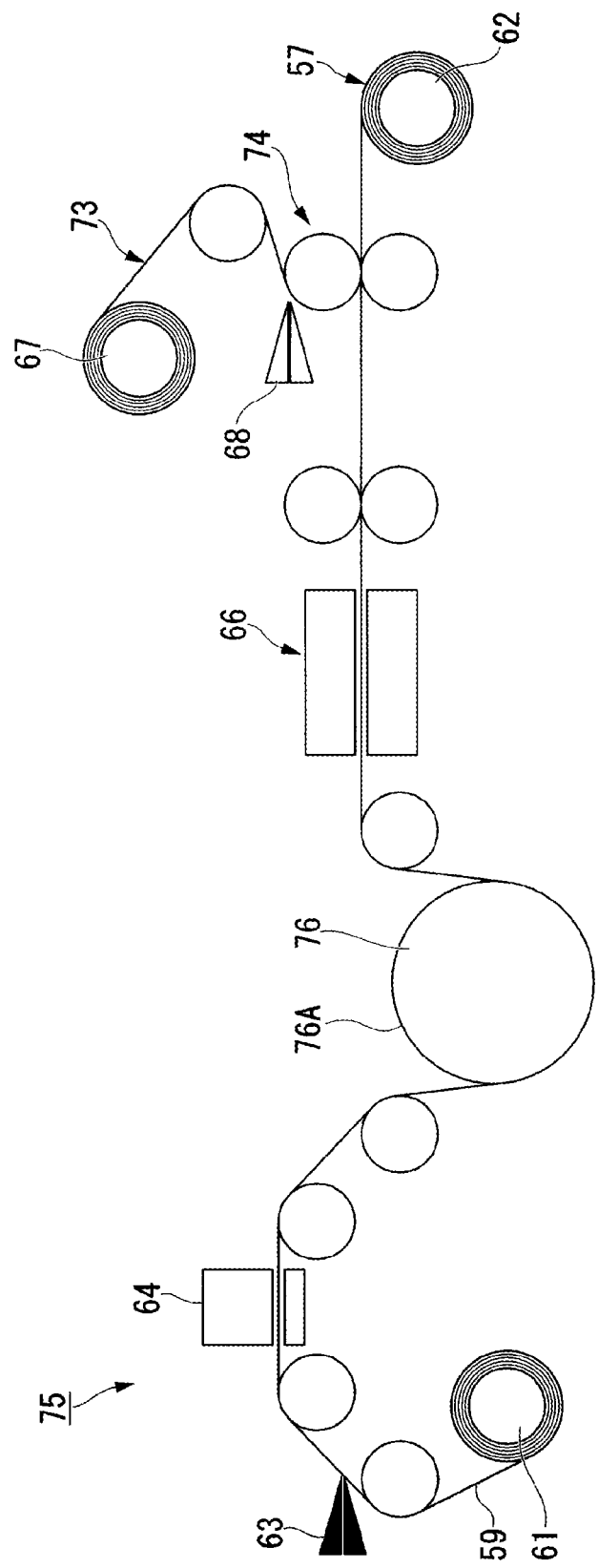
FIG. 38 is a schematic view illustrating one example of a manufacturing apparatus that is used to manufacture the daylighting film according to the fourteenth embodiment.

FIG. 38 is a schematic view illustrating one example of a manufacturing apparatus that is used to manufacture the daylighting film according to the fourteenth embodiment.

In a manufacturing apparatus 75 illustrated in FIG. 38, a long base material 59, which is a mother material of the base member 10 in the daylighting film 56, is conveyed along a roll-to-roll line, and various processes are carried out while the base material 59 is conveyed. Furthermore, in the manufacturing apparatus 75, the first projections 11 and the second projections 12 are formed by employing a columnar projection forming die 76.

The manufacturing apparatus 75 includes a coating device 63, a drying device 64, the projection forming die 76, a second delivery roller 67, and an adhesive coating device 68, and a press-bonding device 74, which are successively disposed above the base material 59 from the side closer to the first delivery roller 61 toward the wind-up roller 62. An irradiation device 66 is disposed under the projection forming die 65 with the base material 59 interposed therebetween.

The projection forming die 76 in this embodiment is a columnar transfer roller having, in its circumferential surface, a transfer pattern 76A corresponding to a concave-convex structure of the base member 10. Thus, the transfer pattern 76A reversed to a concave-convex pattern provided by the first projections 11 and the second projections 12 is formed on the circumferential surface of the projection forming die 76.

(Method of Manufacturing Daylighting Film)

A method of manufacturing the daylighting film of this embodiment will be described below. Here, the manufacturing method is described primarily in connection with a process of manufacturing a stock roll having a large number of daylighting-film formation regions.

FIGS. 39A to 39D are sectional views referenced to successively explain the process of manufacturing the stock roll. It is to be noted that FIGS. 39A to 39D are sectional views taken along a widthwise direction of the base material 59. In the description below, FIG. 38 is also referenced as required.

Figure 39A:
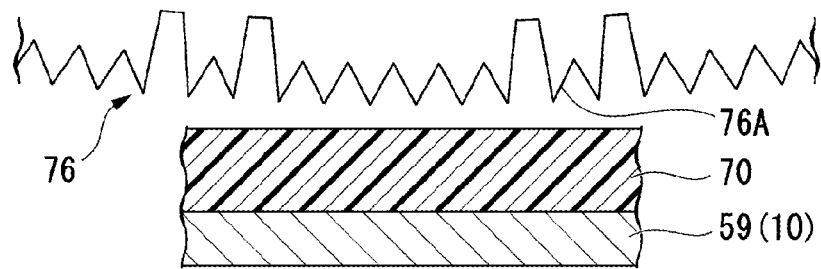
FIG. 39A is a first sectional view referenced to successively explain a process of manufacturing a stock roll.

In the case of manufacturing the daylighting film 56 by the manufacturing apparatus 75, as illustrated in FIGS. 38 and 39A, a photosensitive resin 69 is first coated by the coating device 63 in a predetermined film thickness over one surface of the base material 59, which has been delivered from the first delivery roller 61. The coated photosensitive resin is then dried by the drying device 64 to form a photosensitive resin layer 70.

Figure 39B:
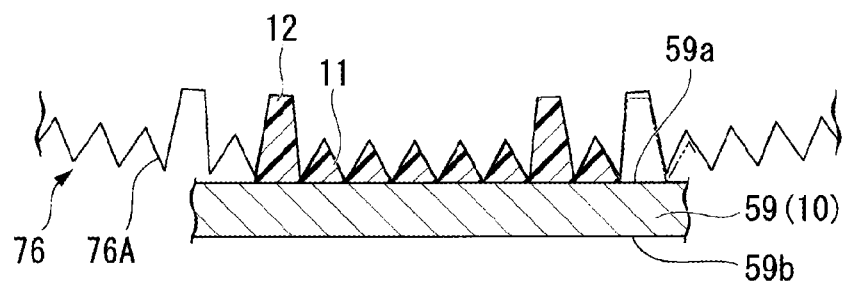
FIG. 39B is a second sectional view referenced to successively explain the process of manufacturing the stock roll.

Next, as illustrated in FIGS. 38 and 39B, the projection forming die 76 having the transfer pattern 76A in its circumferential surface, which is reversed to the concave-convex shape defined by the first projections 11 and the second projections 12, is pressed against the photosensitive resin layer 70. Thereafter, the projection forming die 76 is rotated in parallel with the conveying of the base material 59 to peel off the base material 59 from the projection forming die 76. As a result, the surface shape of the projection forming die 76 is transferred to the surface of the photosensitive resin layer 70.

Figure 39C:
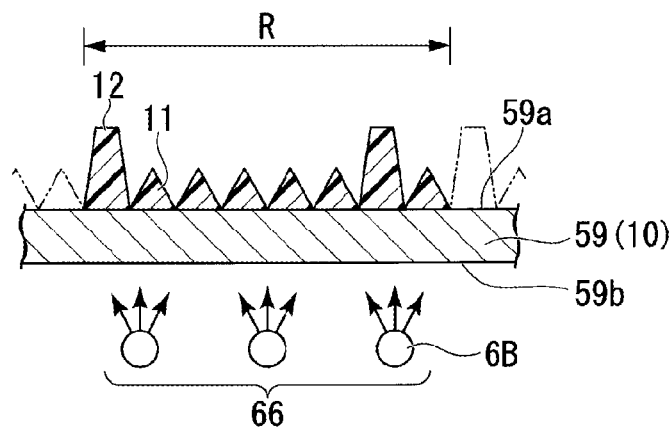
FIG. 39C is a third sectional view referenced to successively explain the process of manufacturing the stock roll.

Next, as illustrated in FIG. 39C, an outer surface 59b of the base material 59 is irradiated with an active energy ray by employing the irradiation device 66. In this embodiment, the photosensitive resin layer 70 is cured by irradiating ultraviolet rays from light sources 6B of the irradiation device 66. Thus, the daylighting-film formation regions R including the first projections 11 and the second projections 12 are formed in the surface 59a of the long base material 59.

Figure 39D:
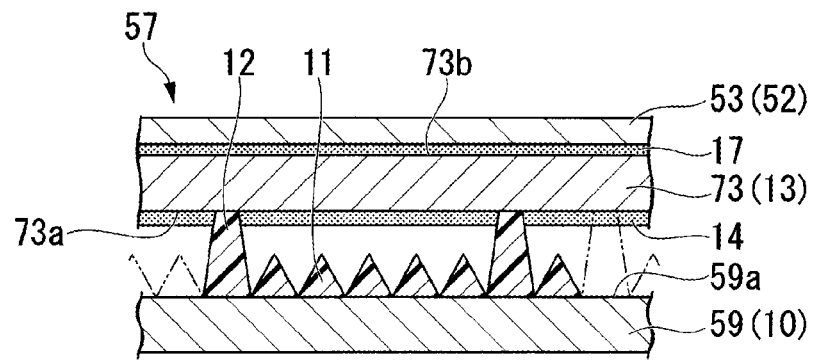
FIG. 39D is a fourth sectional view referenced to successively explain the process of manufacturing the stock roll.

Next, as illustrated in FIGS. 38 and 39D, the protective mother base material 73 including the film base material 53 bonded to its outer surface 73b is delivered from the second delivery roller 67. The adhesive is then coated by the adhesive coating device 68 in the predetermined film thickness over the inner surface 73a of the protective mother base material 73, which has been delivered from the second delivery roller 67, to form the bonding layer 14.

Thereafter, by employing the press-bonding device 74 constituted by a pair of nip rolls, etc., the protective mother base material 73 with the bonding layer 14 oriented to face the base material 59 is bonded to the surface 59a of the base material 59 with the first projections 11 and the second projections 12 interposed therebetween.

In such a way, a stock roll 57 is manufactured.

The manufactured stock roll 57 is once wound over the wind-up roller 62. The daylighting film 56 of this embodiment, illustrated in FIG. 39D, is then obtained by cutting the stock roll 57, wound off from the wind-up roller 62, for each daylighting-film formation region R.

According to this embodiment, since the projection forming die 76 constituted by the columnar transfer roller is used, the transfer pattern 76A can be continuously printed onto the base material 59. As a result, the stock roll 57 can be mass-produced efficiently.

While the fourteenth embodiment has been described in connection with the manufacturing method for the daylighting film in which the separate film is disposed only the front surface side of the daylighting film, it is also possible to add a step of disposing a separate film on the rear surface side of the daylighting film.

[Fifteenth Embodiment]

Figure 40:
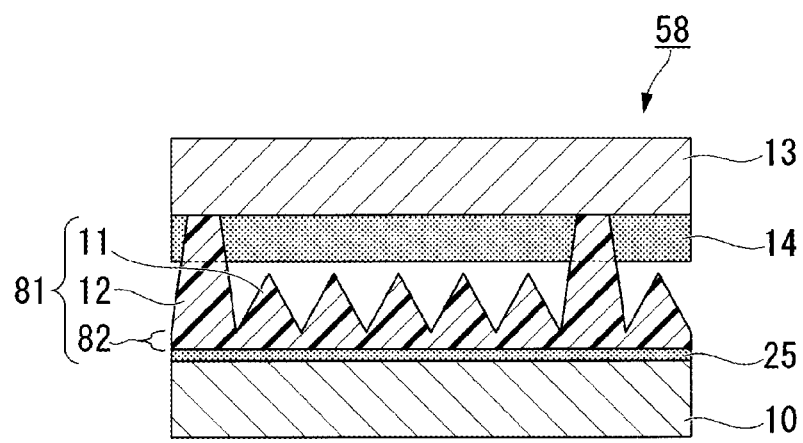
FIG. 40 illustrates a constitution of a daylighting film according to a fifteenth embodiment.

FIG. 40 illustrates a constitution of a daylighting film according to a fifteenth embodiment.

A daylighting film 58 illustrated in FIG. 40 includes the base member 10, a bonding layer 25, a daylighting member 81, the bonding layer 14, and the protective base member 13.

The daylighting member 81 includes the first projections 11 and the second projections 12 both formed on a ground portion 82. The daylighting member 81 is disposed on the inner surface 10a of the base member 10 with the bonding layer 25 interposed therebetween. In the daylighting member 81 according to this embodiment, the first projection 11 and the second projection 12 adjacent to each other are coupled to each other at the base end side by the ground portion 82.

A process of manufacturing the daylighting film according to this embodiment will be described below.

FIGS. 41A to 41C and FIGS. 42A to 42C are explanatory views illustrating a process of individually manufacturing the daylighting film.

Figure 41A:
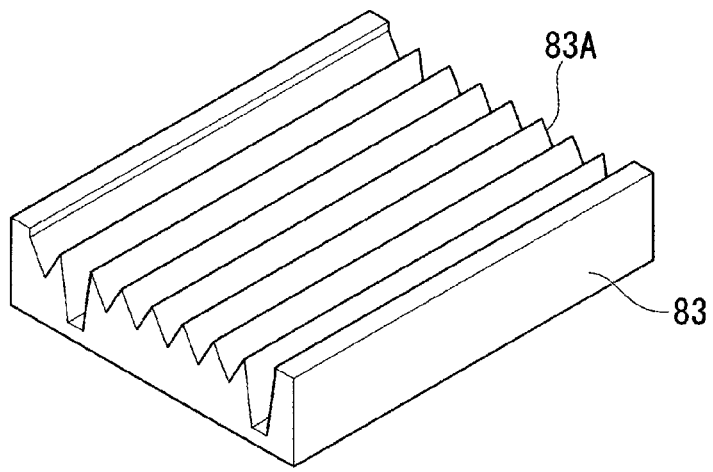
FIG. 41A is a first explanatory view illustrating a process of individually manufacturing the daylighting film.

In the case of manufacturing the daylighting film 58, a projection forming die 83 illustrated in FIG. 41A is prepared. As in the projection forming die 65 described above, a transfer pattern 83A reversed to a concave-convex pattern provided by the first projections 11 and the second projections 12 is formed in a surface of the projection forming die 83.

Figure 41B:
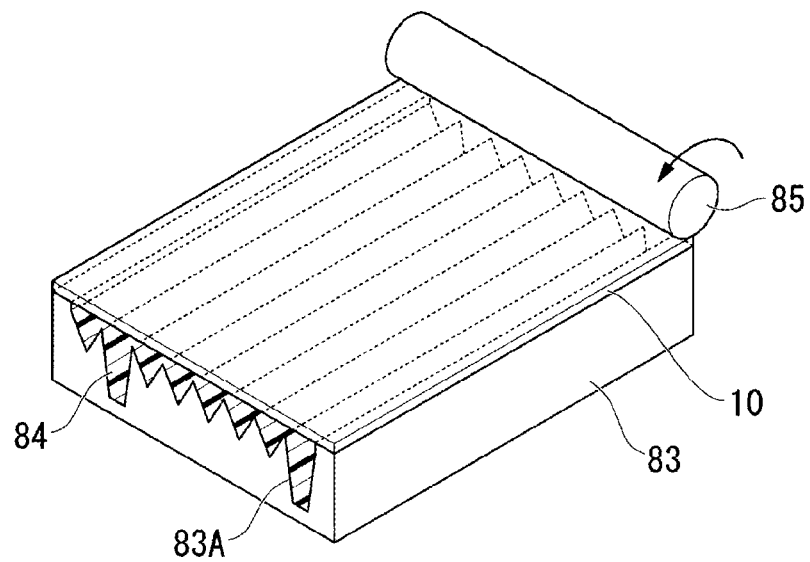
FIG. 41B is a second explanatory view illustrating the process of individually manufacturing the daylighting film.

First, as illustrated in FIG. 41B, a photosensitive resin 84 is coated over the surface of the projection forming die 83. At that time, the photosensitive resin 84 is coated until the transfer pattern 83A of the projection forming die 83 disappears, such that the concave-convex structure formed in the surface of the projection forming die 83 is buried with the photosensitive resin 84. A coating film surface is smoothed by a smoothing roller 85.

The coated photosensitive resin 84 is then dried to form a coating film (hereinafter referred to as a "photosensitive resin layer 86").

Figure 41C:
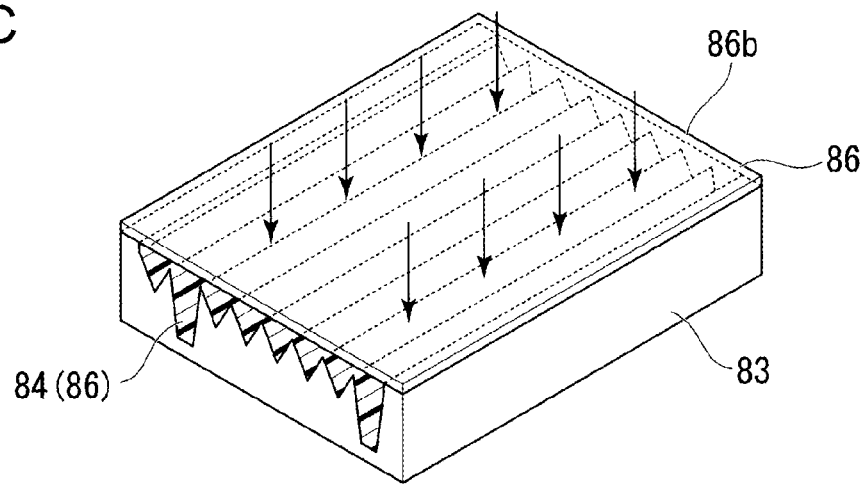
FIG. 41C is a third explanatory view illustrating the process of individually manufacturing the daylighting film.

Next, as illustrated in FIG. 41C, the photosensitive resin layer 86 is cured by irradiating a surface 86a of the photosensitive resin layer 86 with an ultraviolet ray.

Figure 42A:
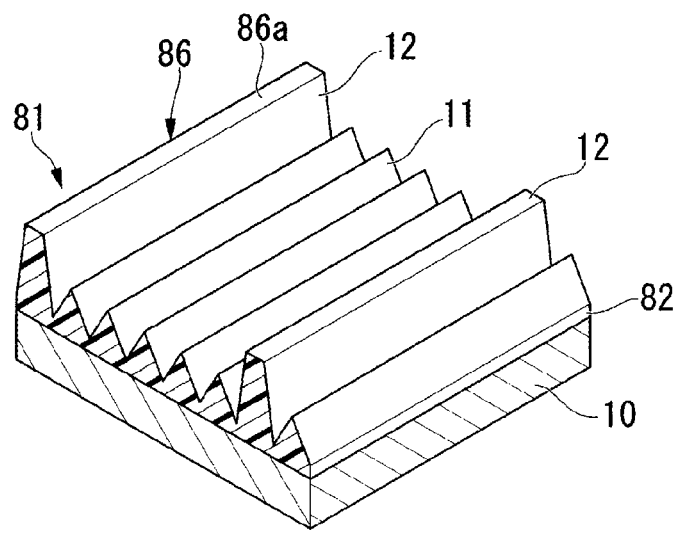
FIG. 42A is a first explanatory view illustrating the process of individually manufacturing the daylighting film.

Next, as illustrated in FIG. 42A, the photosensitive resin layer 86 is peeled off from the projection forming die 83, whereby the surface shape of the projection forming die 83 is transferred to the surface 86a of the photosensitive resin layer 86. As a result, the daylighting member 81 including the first projections 11 and the second projections 12 on the ground portion 82 is formed. Because, in the above step of coating the photosensitive resin, the photosensitive resin 84 is coated in such a thickness that the transfer pattern 83A of the projection forming die 83 disappears, the ground portion 82 is formed, and the first projections 11 and the second projections 12 are coupled to each other at the base end side.

Figure 42B:
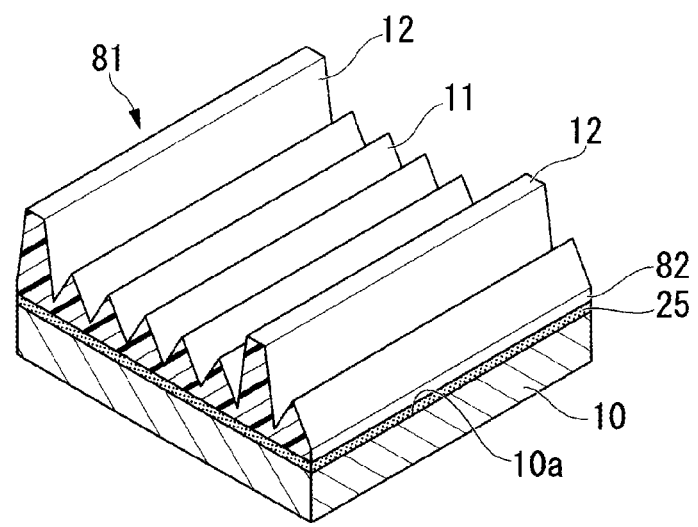
FIG. 42B is a second explanatory view illustrating the process of individually manufacturing the daylighting film.

Next, as illustrated in FIG. 42B, the daylighting member 81 is bonded to the inner surface 10a of the base member 10 with the bonding layer 25 interposed therebetween.

Figure 42C:
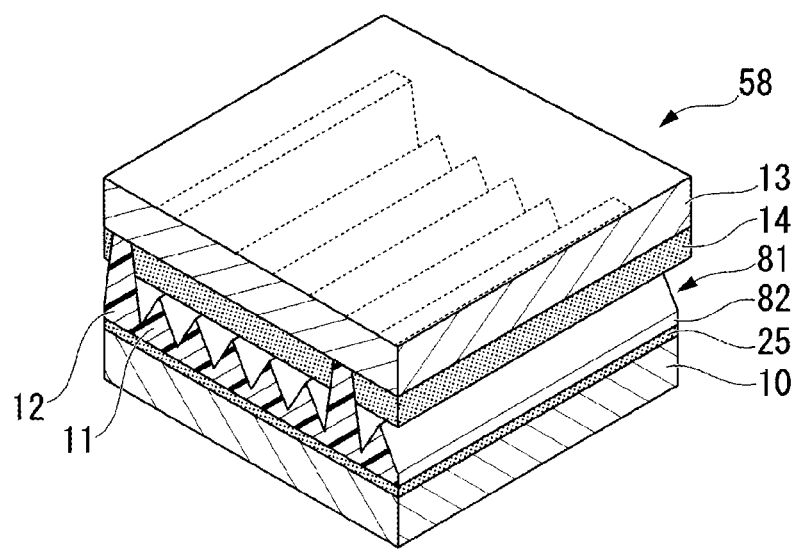
FIG. 42C is a third explanatory view illustrating the process of individually manufacturing the daylighting film.

Next, as illustrated in FIG. 42C, the protective base member 13 is bonded to the daylighting member 81 on the base member 10 with the aid of the bonding layer 14.

In such a way, the daylighting film 58 of this embodiment is completed.

[Sixteenth Embodiment]

Figure 43A:
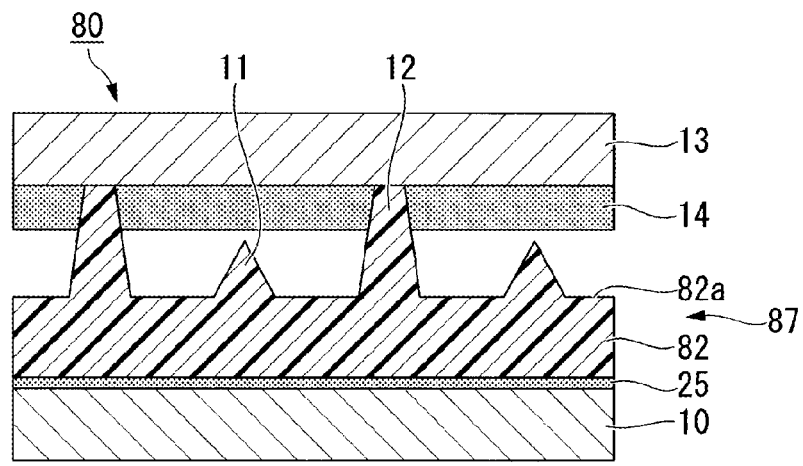
FIG. 43A is a sectional view schematically illustrating a constitution of a daylighting film according to a sixteenth embodiment.
Figure 43B:
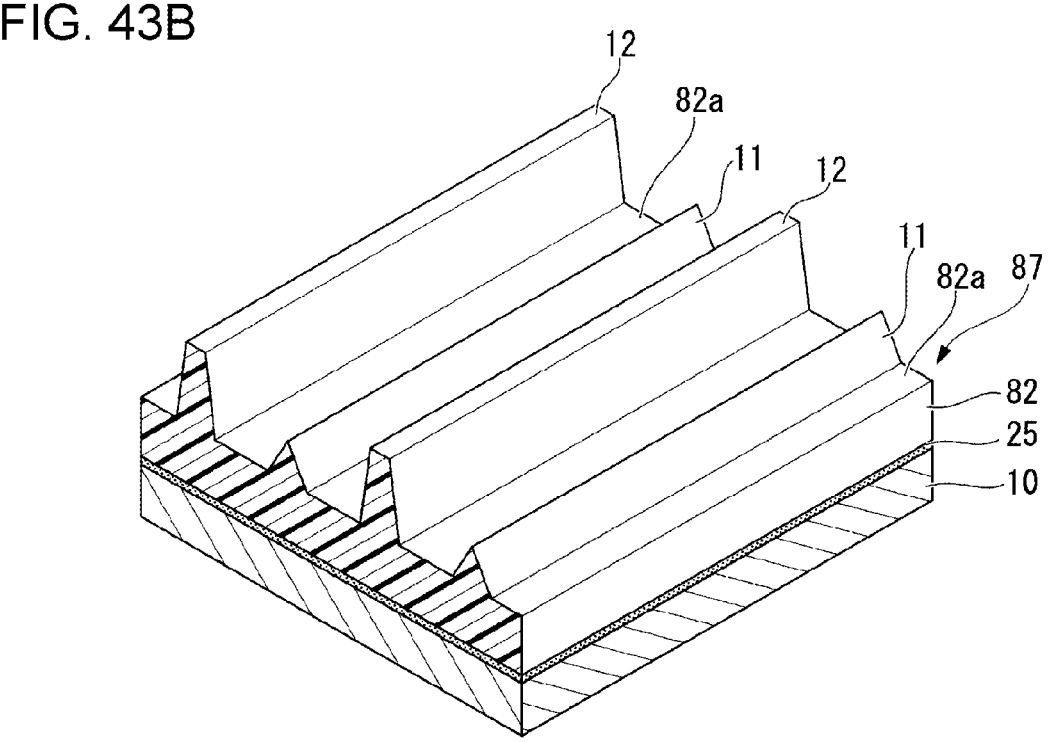
FIG. 43B is a perspective view schematically illustrating a constitution of the daylighting film according to the sixteenth embodiment.

FIG. 43A is a sectional view schematically illustrating a constitution of a daylighting film according to a sixteenth embodiment. FIG. 43B is a perspective view schematically illustrating the daylighting film according to the sixteenth embodiment.

As illustrated in FIGS. 43A and 43B, a daylighting film 80 includes, above the base member 10, a daylighting member 87 including the first projections 11 and the second projections 12, the bonding layer 14, and the protective base member 13.

The daylighting member 87 includes the first projections 11 and the second projections 12 formed on a surface 82a of a ground portion 82. On the ground portion 82, the first projection 11 and the second projection 12 adjacent to each other and the first projections 11 adjacent to each other are arranged at respective predetermined intervals in the array direction of both the projections.

Thus, the first projections 11 and the second projections 12 may be intermittently arranged on the surface 82a of the ground portion 82 that continuously cover one entire surface of the base member 10.

Figure 44A:
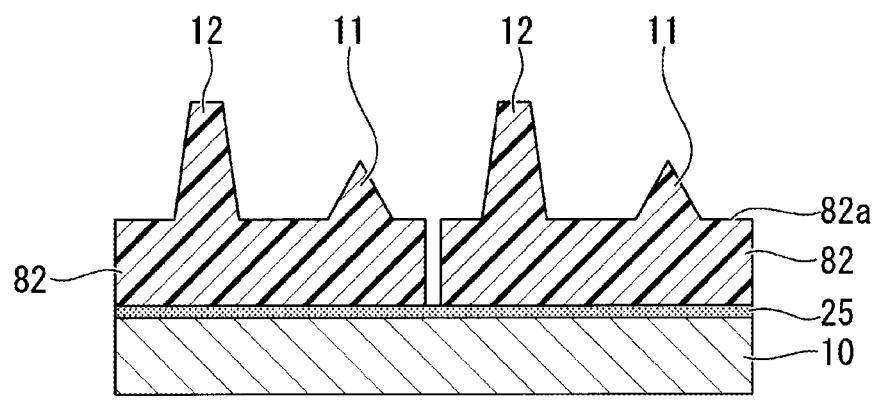
FIG. 44A is a sectional view illustrating another example of a ground portion.

Alternatively, as illustrated in FIG. 44A, the ground portion 82 is not always required to be continuous on the base member 10, and it may be divided into plural portions.

Figure 44B:
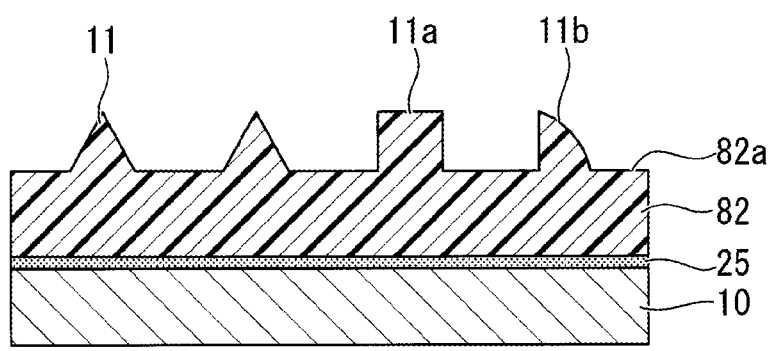
FIG. 44B is a sectional view illustrating an example in which first projections having different sectional shapes are present together.

Furthermore, as illustrated in FIG. 44B, the first projections 11 having different sectional shapes may be present on the ground portion 82 together. For example, a first projection 11a having a rectangular sectional shape and a first projection 11b having a sector-like sectional shape may be formed in addition to the first projection 11 having the triangular sectional shape.

[Illumination Light Control System]

Figure 45:
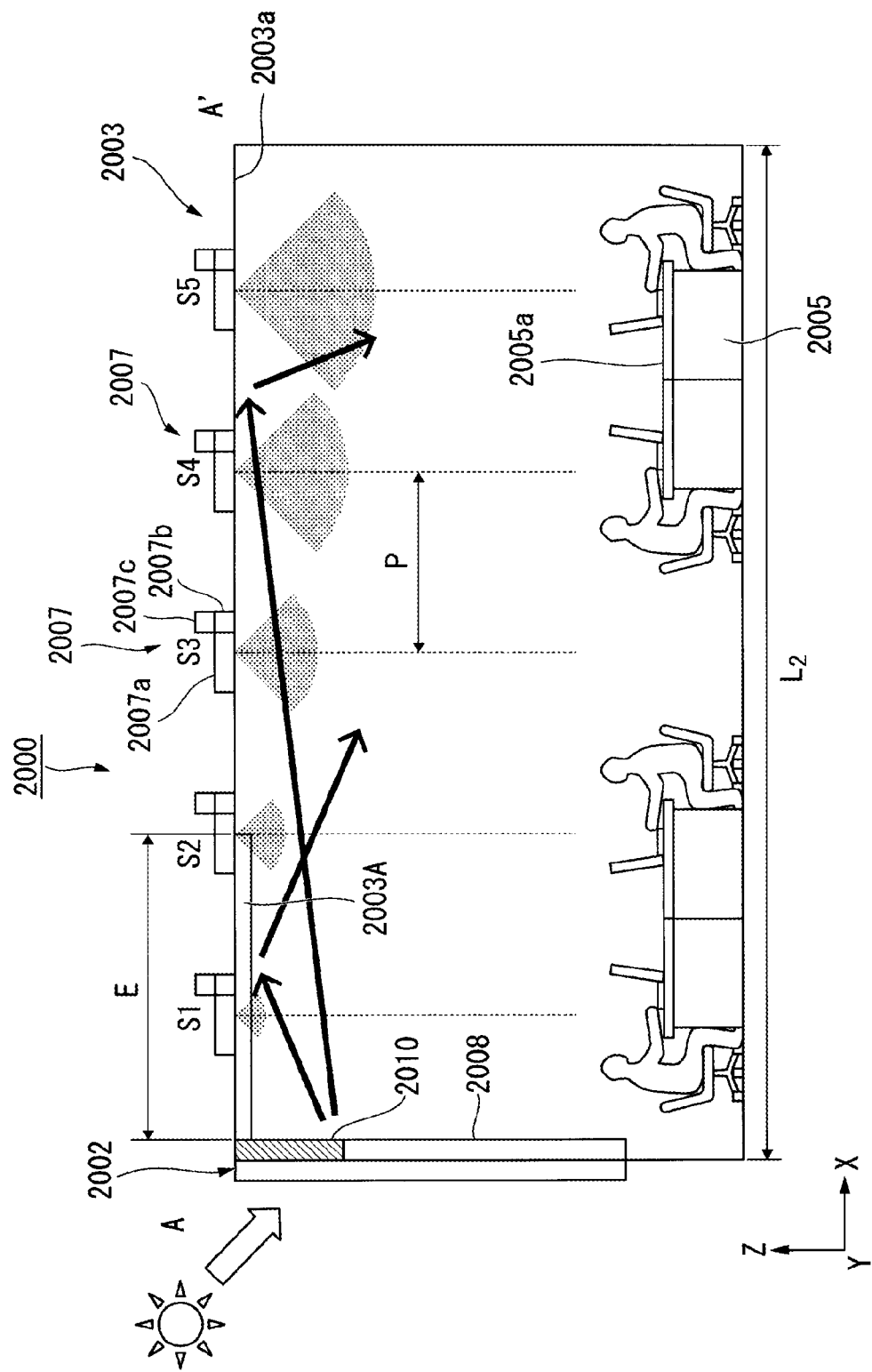
FIG. 45 illustrates a room model 2000 including a daylighting device and an illumination light control system.

FIG. 45 illustrates a room model 2000 including a daylighting device and an illumination light control system.

Figure 46:
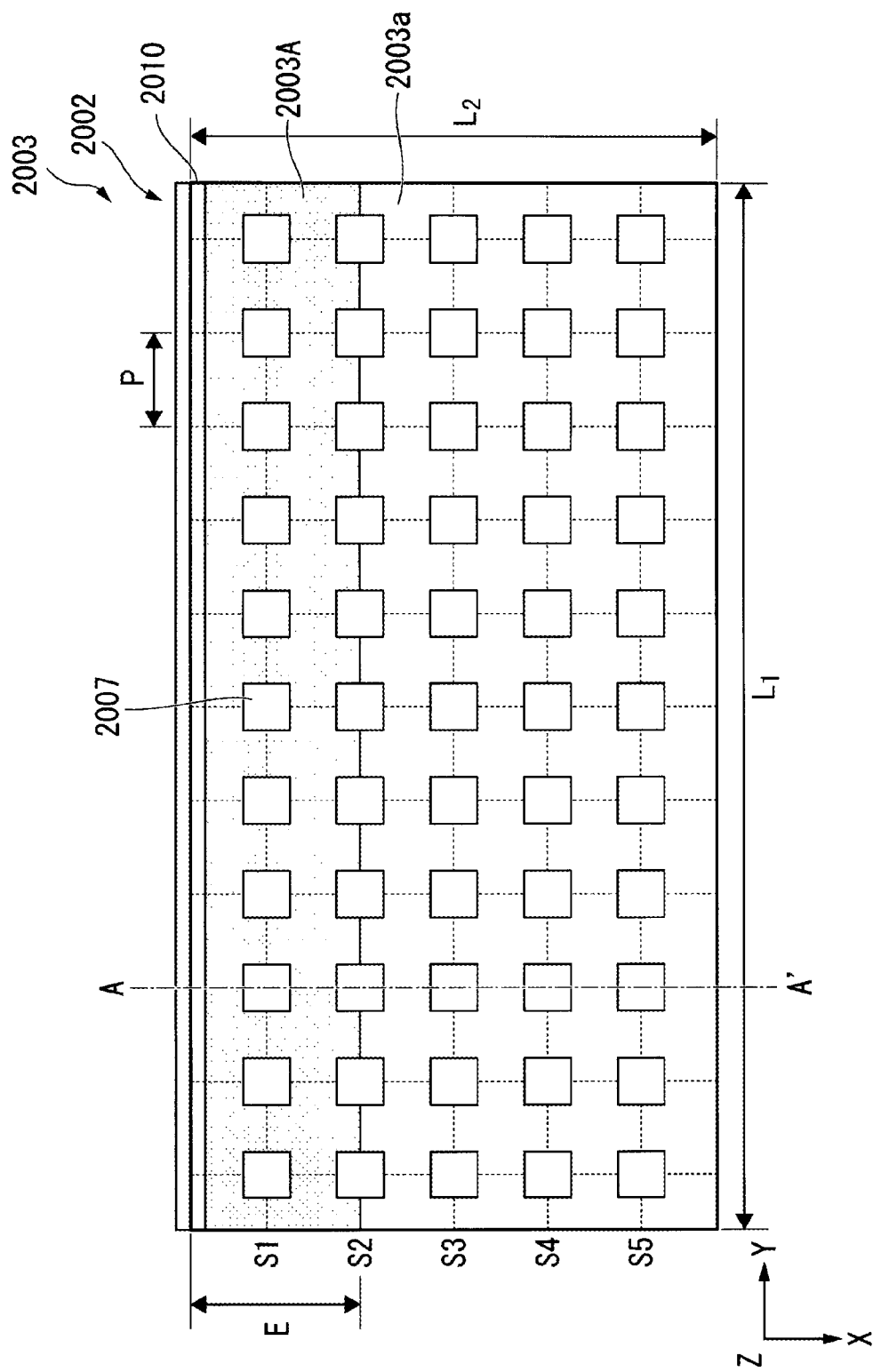
FIG. 46 is a plan view illustrating a ceiling of the room model 2000.

FIG. 46 is a plan view illustrating a ceiling of the room model 2000.

In the present invention, a ceiling material constituting a ceiling 2003a of a room 2003 into which outside light is introduced may have high optical reflectivity. As the ceiling material having reflectivity, an optically reflective ceiling member 2003A is disposed at the ceiling 2003a of the room 2003 as illustrated in FIGS. 45 and 46. The optically reflective ceiling member 2003A is disposed at the ceiling 2003a near a window 2002 with intent to promote the outside light incoming through a daylighting device 2010, which is disposed in a window 2002, to be introduced toward the inner side of the room. More specifically, the optically reflective ceiling member 2003A is disposed in a predetermined region E (region within about 3 m from the window 2002) of the ceiling 2003a.

As mentioned above, the optically reflective ceiling member 2003A has a role to efficiently introduce, toward the inner side of the room, the outside light incoming to the room through the window 2002 where the daylighting device 2010 of the present invention (i.e., the daylighting device according to one of the above-described embodiments) is disposed. The outside light introduced toward the ceiling 2003a of the room through the daylighting device 2010 is reflected by the optically reflective ceiling member 2003A to change its direction and to illuminate an upper surface 2005a of a desk 2005 placed in the inner side of the room. Thus, an effect of lighting the desk surface 2005a is obtained.

The optically reflective ceiling member 2003A may be diffusely reflective or specularly reflective. However, the optically reflective ceiling member 2003A preferably has both the reflective characteristics that are appropriately mixed, from the viewpoint of simultaneously achieving the effect of lighting the upper surface 2005a of the desk 2005 placed in the inner side of the room and an effect of suppressing glare light that is unpleasant to people in the room.

While a large part of the light introduced to the room through the daylighting device 2010 of the present invention advances toward the ceiling near the window 2002, a light quantity near the window 2002 is sufficient in many cases. Thus, by employing the above-described optically reflective ceiling member 2003A in a combined manner, the light incoming and reaching the ceiling near the window (in the region E) can be distributed toward the inner side of the room where a light quantity is smaller than near the window.

The optically reflective ceiling member 2003A can be fabricated, for example, by embossing a metal plate made of, e.g., aluminum to form a concave-convex pattern on the order of several microns, or by vapor-depositing a metal thin film made of, e.g., aluminum on a surface of a resin substrate on which a similar concave-convex pattern is formed. As an alternative, the concave-convex pattern formed by embossing may be provided by employing curved surfaces that are formed at a larger period.

Moreover, a luminous intensity characteristic and a light distribution in the room can be controlled by changing, as required, the shape of embosses formed on the optically reflective ceiling member 2003A. For example, in the case of forming the embosses in the stripe shape extending toward the inner side of the room, the light reflected by the optically reflective ceiling member 2003A is caused to spread in a right-left direction of the window 2002 (i.e., in a direction crossing a lengthwise direction of the stripe-shaped embosses constituting the concave-convex pattern). When the size and the orientation of the window 2002 in the room 2003 are limited, the optically reflective ceiling member 2003A can be employed to diffuse light in the horizontal direction and to reflect light toward the inner side of the room by utilizing the above-mentioned property.

The daylighting device 2010 of the present invention is used as a part of the illumination light control system for the room 2003. The illumination light control system is constituted by various components adapted for the entire room, including, e.g., the daylighting device 2010, a plurality of room illumination devices 2007, a daylight adjustment device 2008 installed in the window, a control system 2009 for the above-mentioned devices, and the optically reflective ceiling member 2003A disposed at the ceiling 2003a.

In the window 2002 of the room 2003, the daylighting device 2010 is disposed on the upper side, and the daylight adjustment device 2008 is installed on the lower side. A blind is installed as the daylight adjustment device 2008 here, but the daylight adjustment device 2008 is not limited to the blind.

In the room 2003, the room illumination devices 2007 are arranged in a lattice pattern along the right-left direction (Y-direction) of the window 2002 and along a direction toward the inner side of the room (X-direction). The room illumination devices 2007 constitute an entire illumination system for the room 2003 in cooperation with the daylighting device 2010.

FIGS. 45 and 46 illustrate the ceiling 2003a of an office in which a length L1 in the right-left direction (Y-direction) of the window 2002 is 18 m and a length L2 in the direction toward the inner side of the room 2003 (X-direction) is 9 m. In the illustrated example, the room illumination devices 2007 are arranged at the ceiling 2003a in a lattice pattern at a pitch P of 1.8 m in each of a lateral direction (Y-direction) and the direction toward the inner side (X-direction). More specifically, fifty room illumination devices 2007 are arrayed in a pattern of 10 rows (Y-direction)×5 columns (X-direction).

The room illumination devices 2007 each include a room luminaire 2007a, a brightness sensor 2007b, and a controller 2007c. The brightness sensor 2007b and the controller 2007c are integrated with the room luminaire 2007a.

Each room illumination device 2007 may include the plurality of room luminaires 2007a and the plurality of the brightness sensors 2007b. The brightness sensors 2007b are disposed in a one-to-one relation to the room luminaires 2007a. The brightness sensor 2007b receives light reflected from a surface illuminated by the room luminaire 2007a, and detects the illuminance of the illuminated surface. Here, the brightness sensor 200b detects the illuminance on the upper surface 2005a of the desk 2005 placed in the room.

The controllers 2007c disposed in the room illumination devices 2007 in a one-to-one relation are connected to each other. In the room illumination devices 2007, the interconnected controllers 2007c execute feedback control to adjust light outputs of respective LED lamps of the room luminaires 2007a such that illuminance values at the desk surfaces 2005a detected by the brightness sensors 2007b are kept constant at a target illuminance L0 (e.g., average illuminance: 750 lx).

Figure 47:
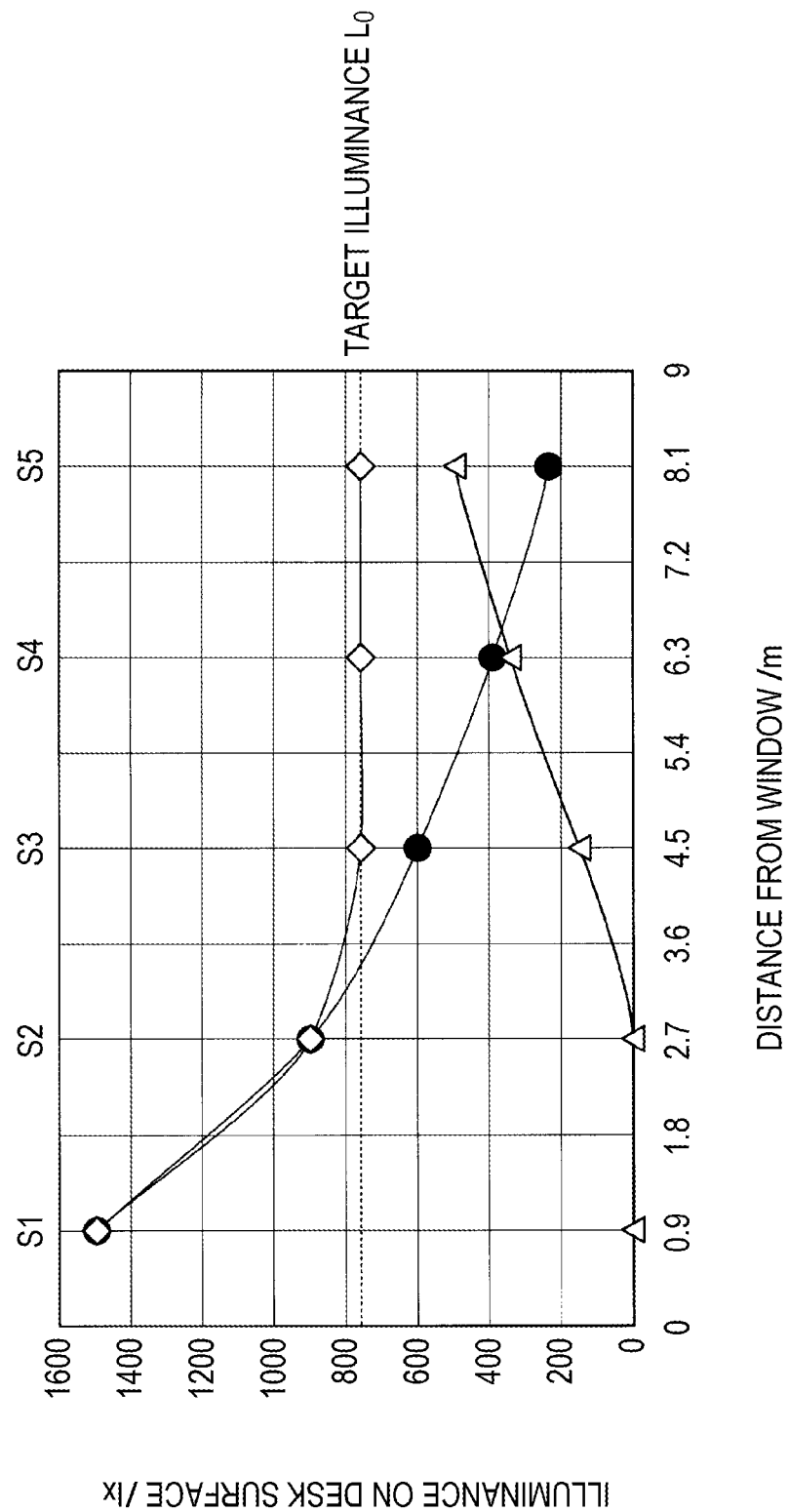
FIG. 47 is a graph depicting a relation between illuminance of light (natural light) taken into a room by the daylighting device and illuminance obtained with room illumination devices (illumination light control system).

FIG. 47 is a graph depicting a relation between illuminance of light (natural light) taken into the room by the daylighting device and illuminance obtained with the room illumination devices (illumination light control system).

As depicted in FIG. 47, the illuminance on the desk surface with the daylighting device 2010 (natural daylighting) reduces as a distance from the window increases. On the other hand, in the case of employing the room illumination devices 2007 (illumination light control system) installed at the ceiling of the room on condition that the daylighting device 2010 is not installed at the window, the illuminance on the desk surface is controlled to gradually rise as the distance from the window increases. As seen from FIG. 47, in the case of employing the daylighting device 2010 and the room illumination devices 2007 (illumination light control system) in a combined manner, the illuminance on the desk surface in the room is entirely higher than that in the case of employing either the daylighting device 2010 or the room illumination devices 2007 (illumination light control system). Although the region near the window is brightest and the brightness is reduced to some extent as the distance from the window increases, a substantially constant illuminance (average illuminance: 750 lx) is obtained by utilizing the effect of the daylighting device 2010.

As described above, by employing the daylighting device 2010 and the room illumination devices 2007 (illumination light control system) in a combined manner, light can be introduced to the inner side of the room, and brightness in the entire room can be further increased. Accordingly, more stable and brighter light environment can be obtained without being affected by the sun altitude.

While the preferred embodiments of the present invention have been described above with reference to the accompanying drawings, it is needless to say that the present invention is not limited to the above embodiments. It is apparent to those skilled in the art that various modifications or alterations are conceivable within the scope of the technical concept defined in Claims. Those modifications or alterations are to be as a matter of course construed to fall within the technical scope of the present invention.

INDUSTRIAL APPLICABILITY

The present invention can be applied to a daylighting film, a stock roll of the daylighting film, a window glass, a roll screen, and a daylighting louver.

REFERENCE SIGNS LIST 1, 4, 5, 6, 7, 8, 9, 20, 30, 40, 50, 101, 102, 202, 301, 302, 303, 304, 305, 501 . . . daylighting film, 10 . . . base member (first base member), 10a . . . inner surface (first surface), 11, 31 . . . projection (first projection), 12, 22, 32, 42 . . . projection (second projection), 12a, 32a, 42a . . . end surface, 11c2, 12c2, 32c2, 42c2 . . . lateral surface (reflective surface), 13 . . . protective base member (second base member), 13b . . . outer surface (second surface), 14 . . . bonding layer (adhesive), 15, 15A, 15B, 15C, 15D, 15E, 15F . . . gap, 18, 19A, 19B . . . irregularities or uneven surface, 42 . . . lateral surface (inclined surface), 54 . . . adhesive, 54A . . . spacer, h1, h2 . . . height, L0, L1, T1, T2 . . . light

The invention claimed is:
1. A daylighting film comprising:
a first base member having optical transparency, the first base member comprising a first surface and a second surface;
a plurality of first projections having optical transparency and formed on the first surface;
a plurality of second projections formed on the first surface and having a height from the first surface higher than a height of the plurality of first projections;
a second base member arranged in an opposite relation to the first surface, the second base member comprising a third surface and a fourth surface;
an adhesive for bonding the plurality of second projections and the second base member, the adhesive being provided in a region formed by side surfaces of the plurality of second projections, the third surface and a predetermined surface that is higher than the third suface by a predetermined height; and gaps defined between the plurality of first projections and between the plurality of first projections and the plurality of second projections, wherein the plurality of first projections comprise reflective surfaces at which light incoming from a side of the second surface of the first base member or a side of the fourth surface of the second base member is totally reflected.

2. The daylighting film according to claim 1, wherein the plurality of second projections have optical transparency.

3. The daylighting film according to claim 1, wherein the predetermined height is smaller than a difference between a height of the plurality of second projections and a height of the plurality of first projections.

4. The daylighting film according to claim 1, wherein an upper end of the plurality of second projections contacts the third surface.

5. A daylighting film comprising:
a first base member having optical transparency, the first base member comprising a first surface and a second surface;
a plurality of first projections and a plurality of second projections both having optical transparency and formed on the first surface;
a second base member arranged in an opposite relation to the first surface, the second base member comprising a third surface and a fourth surface;
a first gap defined between the plurality of first projections;
a second gap defined between the plurality of second projections;
a third gap defined between one of the plurality of first projections and one of the plurality of second projections; and
an adhesive filled into the second gap, the adhesive bonding the first base member and the second base member,
wherein the plurality of first projections and the plurality of second projections comprise reflective surfaces at which light incoming from a side of the second surface of the first base member or a side of the fourth surface of the second base member is totally reflected.

6. The daylighting film according to claim 5, wherein the adhesive is filled into the second gap surrounded by the plurality of second projections adjacent to each other on the first surface of the first base member, and by the second base member.

7. The daylighting film according to claim 5, wherein the adhesive is filled into the second gap surrounded by the plurality of second projections, the second gap being positioned in a space sandwiched between the first base member and the second base member.

8. The daylighting film according to claim 5, wherein the plurality of second projections comprise end surfaces formed, on a side close to the second base member, parallel to the first surface.

9. The daylighting film according to claim 8, wherein a light transmittance T1 in regions of the first surface of the first base member where the end surfaces of the plurality of second projections are present, and a light transmittance T2 in other regions satisfy a relation of T1<T2.

10. The daylighting film according to claim 5, wherein the adhesive is not filled in the first gap or the third gap.

11. The daylighting film according to claim 5, wherein an upper end of the plurality of second projections contacts the third surface.

12. A daylighting film comprising:
a first base member having optical transparency;
a plurality of projections having optical transparency and formed on a first surface of the first base member;
a second base member arranged in an opposite relation to the first surface of the first base member;
an adhesive for bonding the first base member and the second base member, the adhesive including a spacer; and
a gap defined between the plurality of projections,
wherein the plurality of projections comprise reflective surfaces at which light incoming from a second surface side of the second base member or the first base member is totally reflected.

13. The daylighting film according to claim 12, wherein, assuming that a surface area of an inclined surface of the plurality of projections is denoted by Sa, and a surface area of a portion of the inclined surface, the portion being buried in the adhesive, is denoted by Sb, Sb≤Sa/2 is satisfied.

14. The daylighting film according to claim 12, wherein an irregular or uneven surface is formed at an end of the plurality of projections on a side close to the second base member, the end contacting the adhesive.

15. The daylighting film according to claim 12, wherein the adhesive is only provided in a region between a part of the first surface and a part of the third surface.

16. The daylighting film according to claim 12, wherein the adhesive has a circular hollow cylinder shape, and the spacer has a spherical shape.

* * * * *